US012633570B2

(12) United States Patent
Li et al.

(10) Patent No.: US 12,633,570 B2
(45) Date of Patent: May 19, 2026

(54) SECONDARY BATTERY ELECTROLYTE SOLUTION, SECONDARY BATTERY, BATTERY MODULE, BATTERY PACK, AND ELECTRICAL DEVICE

(71) Applicant: CONTEMPORARY AMPEREX TECHNOLOGY (HONG KONG) LIMITED, Hong Kong (CN)

(72) Inventors: Xiaolong Li, Ningde (CN); Xinxin Zhang, Ningde (CN); Bingkun Guo, Ningde (CN); Ben Liu, Ningde (CN); Shikang Yao, Ningde (CN); Qicheng Zhou, Ningde (CN); Jiadian Lan, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/180,787

(22) Filed: Apr. 16, 2025

(65) Prior Publication Data

US 2025/0246681 A1 Jul. 31, 2025

Related U.S. Application Data

(63) Continuation of application No. PCT/CN2022/141609, filed on Dec. 23, 2022.

(51) Int. Cl.
*H01M 10/0565* (2010.01)

(52) U.S. Cl.
CPC .................. *H01M 10/0565* (2013.01); *H01M 2300/0082* (2013.01)

(58) Field of Classification Search
None
See application file for complete search history.

(56) References Cited

U.S. PATENT DOCUMENTS

| | | | | |
|---|---|---|---|---|
| 6,537,701 | B1 | 3/2003 | Nimon et al. | |
| 2004/0124402 | A1* | 7/2004 | Nanba | H01M 4/366 252/500 |
| 2013/0298386 | A1* | 11/2013 | Tarascon | H01M 10/0525 29/623.1 |
| 2017/0062868 | A1* | 3/2017 | Kageura | H01M 4/525 |
| 2018/0237656 | A1* | 8/2018 | Dai | H01M 10/625 |
| 2018/0355116 | A1 | 12/2018 | Wunder et al. | |
| 2023/0352695 | A1* | 11/2023 | Zeng | H01M 4/667 |

FOREIGN PATENT DOCUMENTS

| | | | | | |
|---|---|---|---|---|---|
| CN | 106030888 | A | | 10/2016 | |
| CN | 106654353 | A | * | 5/2017 | H01M 10/0525 |
| CN | 109103488 | A | | 12/2018 | |
| CN | 109873208 | A | | 6/2019 | |
| CN | 111653825 | A | | 9/2020 | |
| CN | 113451546 | A | | 9/2021 | |
| CN | 114824167 | A | | 7/2022 | |
| JP | 05135799 | A | * | 6/1993 | |
| JP | H06290793 | A | | 10/1994 | |
| JP | 2003288940 | A | | 10/2003 | |
| JP | 2007095657 | A | | 4/2007 | |
| JP | 2012212516 | A | | 11/2012 | |
| JP | 2018195574 | A | | 12/2018 | |
| KR | 20220108703 | A | | 8/2022 | |
| WO | 2015125840 | A1 | | 8/2015 | |

OTHER PUBLICATIONS

Machine translation of JPH05135799A, published on Jun. 1, 1993 (Year: 1993).*
Machine translation of CN 1091034488A, published on Dec. 29, 2018 (Year: 2018).*
Machine translation of CN106654353A, published on May 10, 2017 (Year: 2017).*
The World Intellectual Property Organization (WIPO) International Search Report and Written Opinion for PCT/CN2022/141609 Jun. 21, 2023 13 Pages (including translation).
The European Patent Office (EPO) Communication pursuant to Rule 164(1) EPC for Application No. 22969023.5 Oct. 15, 2025 16 Pages.
Korean Intellectual Property Office (KIPO) Notice of Submission of Opinion for Application No. 10-2025-7013753 Mar. 23, 2026 34 Pages (including translation).
The Japan Patent Office (JPO) Notice of Reasons for Refusal for Application No. 2025-524360 Apr. 2, 2026 14 Pages (including translation).

* cited by examiner

*Primary Examiner* — Anca Eoff
(74) *Attorney, Agent, or Firm* — ANOVA LAW GROUP, PLLC

(57) ABSTRACT

An electrolyte solution includes an electrolyte salt, a solvent, and a polyether. A secondary battery includes the electrolyte solution. A method for preparing a secondary battery electrolyte solution includes adding an additive and a cyclic ether compound into a composition containing an electrolyte salt and a solvent, and performing in-situ polymerization for at least 24 hours to obtain the secondary battery electrolyte solution. The additive is a Lewis acid or a Lewis acid precursor.

15 Claims, 6 Drawing Sheets

SECONDARY BATTERY ELECTROLYTE SOLUTION, SECONDARY BATTERY, BATTERY MODULE, BATTERY PACK, AND ELECTRICAL DEVICE

CROSS-REFERENCE TO RELATED APPLICATION

This application is a continuation of International Application No. PCT/CN2022/141609, filed on Dec. 23, 2022, the entire content of which is incorporated herein by reference.

TECHNICAL FIELD

This application relates to the technical field of secondary batteries, and in particular, to a secondary battery electrolyte solution, a secondary battery, a battery module, a battery pack, and an electrical device.

BACKGROUND

With the development of society, various problems such as energy shortage and environmental pollution are increasingly prominent. To achieve the goal of sustainable development, researchers are turning their attention to secondary batteries. A secondary battery is an energy storage system preferred for portable electronic products and electric vehicles. However, in a high-temperature environment, the secondary battery incurs a significant decline in performance and severe safety hazards.

An electrolyte solution serves as a medium for transferring secondary ions between a positive electrode and a negative electrode, and the performance of the electrolyte solution directly affects the performance of the secondary battery at high temperature. The electrolyte solution in the related art is highly decomposable in a high-temperature environment, and is prone to react with the negative electrode to produce gas severely. Therefore, developing an electrolyte solution of high stability at high temperature to improve the high-temperature performance of a battery becomes a pressing technical challenge for a person skilled in the art.

SUMMARY

This application is developed in view of the above challenges. An objective of this application is to provide an electrolyte solution to reduce the gas production phenomena of the battery at high temperature, and expand the environment in which the battery is applicable.

A first aspect of this application provides a secondary battery electrolyte solution, including an electrolyte salt, a solvent, and a polyether.

The polyether in the electrolyte solution can provide a polymer framework, reduce the kinetic activity of solvent molecules in the electrolyte solution, reduce direct contact between a positive or negative electrode and the solvent, suppress the gas production phenomenon of the secondary battery during high-temperature cycling, and improve safety performance of the battery at high temperature.

In some embodiments, the electrolyte solution includes lithium ions. A mass percent of the lithium ions is 0.05% to 0.46% based on a total mass of the electrolyte solution.

The lithium ions at an appropriate mass percent can further improve the normal-temperature cycle performance and high-temperature cycle performance of the battery through a synergistic effect, and reduce the high-temperature gas production phenomena of the battery.

In any embodiment, a mass percent of the polyether is 10% to 70% based on a total mass of the electrolyte solution.

The polyether at an appropriate mass percent endows the electrolyte solution with an appropriate viscosity, makes the battery excellent in first-cycle Coulombic efficiency, normal-temperature cycle performance, and high-temperature performance, and reduces the amount of gas produced at high temperature, thereby broadening the temperature range in which the battery is applicable.

In any embodiment, the polyether is generated by in-situ polymerization from a cyclic ether compound in the electrolyte solution as initiated by a Lewis acid.

With the polyether generated through in-situ polymerization in the electrolyte solution, the polyether is uniformly distributed in the electrolyte solution, thereby effectively reducing the high-temperature gas production phenomena of the battery.

In any embodiment, the Lewis acid is derived from an additive in the electrolyte solution. The additive includes one or more of lithium hexafluorophosphate, lithium tetrafluoroborate, lithium perchlorate, or lithium difluoro(oxalato)borate.

Under specified conditions, the lithium hexafluorophosphate, lithium tetrafluoroborate, lithium perchlorate, and lithium difluoro(oxalato)borate can produce a Lewis acid used for initiating the in-situ polymerization of the cyclic ether compound to generate a polyether. In addition, the additive can provide lithium ions in a specified amount. The lithium ions can improve the normal-temperature cycle performance and high-temperature cycle performance of the battery through a synergistic effect, and reduce the high-temperature gas production phenomena of the battery.

In any embodiment, the Lewis acid is derived from an additive in the electrolyte solution. The additive includes one or two of lithium hexafluorophosphate or lithium tetrafluoroborate.

The appropriate additive can improve the normal-temperature cycle performance and high-temperature cycle performance of the battery, and reduce the high-temperature gas production phenomena of the battery.

In any embodiment, based on a total mass of the electrolyte solution, a mass percent of the added additive is 1% to 10%.

The additive added at an appropriate mass percent endows the electrolyte solution with an appropriate viscosity and high ionic conductivity, makes the battery excellent in first-cycle Coulombic efficiency, normal-temperature cycle performance, and high-temperature cycle performance, and reduces the amount of gas produced at high temperature, thereby further broadening the temperature range in which the battery is applicable.

In any embodiment, based on a total mass of the electrolyte solution, a mass percent of the added additive is 2% to 6%.

The additive added at an appropriate mass percent can improve the first-cycle Coulombic efficiency, normal-temperature cycle performance, and high-temperature cycle performance of the battery, and reduce the high-temperature gas production phenomena of the battery.

In any embodiment, the cyclic ether compound includes one or more of 1,3-dioxolane, ethylene glycol diglycidyl ether, 1,4-butanediol glycidyl ether, 1,2,3,4-diepoxybutane, tetrahydrofuran, methyltetrahydrofuran, 1,4-dioxane, or tetrahydropyran.

The above ring-opening polymerization of the cyclic ether compound occurs under mild conditions, thereby facilitating the in-situ polymerization reactions. The polyether generated at an appropriate mass percent endows the electrolyte solution with an appropriate viscosity and high ionic conductivity, makes the battery excellent in first-cycle Coulombic efficiency, normal-temperature cycle performance, and high-temperature cycle performance, and reduces the amount of gas produced at high temperature, thereby further broadening the temperature range in which the battery is applicable.

In any embodiment, the cyclic ether compound includes one or more of 1,3-dioxolane, tetrahydrofuran, 1,4-dioxane, or tetrahydropyran.

In any embodiment, the solvent includes a chain ether compound.

The chain ether compound endows the electrolyte solution with an appropriate viscosity and excellent ionic conductivity. In addition, the chain ether compound includes the same ether bond as the polyether, thereby improving the compatibility of the electrolyte system. The chain ether compound used as a solvent can further improve the uniformity of distribution of the polyether in the electrolyte solution, improve the first-cycle Coulombic efficiency, normal-temperature cycle performance, and high-temperature cycle performance of the battery, and reduce the amount of gas produced by the battery at high temperature, thereby improving the electrochemical performance and safety performance of the battery and broadening the temperature range in which the battery is applicable.

In any embodiment, the solvent includes one or more of ethylene glycol dimethyl ether, diethylene glycol dimethyl ether, triethylene glycol dimethyl ether, tetraethylene glycol dimethyl ether, ethylene glycol diethyl ether, or ethylene glycol dibutyl ether.

In any embodiment, based on a total volume of the solvent in the electrolyte solution, a volume content of the added cyclic ether compound is ⅕ to 5.

The cyclic ether compound at an appropriate volume content makes the electrolyte solution contain a polyether at an appropriate mass percent, ensures that the electrolyte solution is of an appropriate viscosity and excellent ionic conductivity, reduces the high-temperature gas production phenomena of the battery, and ensures an excellent level of the first-cycle Coulombic efficiency, normal-temperature cycle performance, and high-temperature cycle performance of the battery.

In any embodiment, based on a total volume of the solvent in the electrolyte solution, a volume content of the added cyclic ether compound is ⅓ to 3.

The cyclic ether compound at an appropriate volume content makes the electrolyte solution contain a polyether at an appropriate mass percent, ensures that the electrolyte solution is of an appropriate viscosity and excellent ionic conductivity, reduces the high-temperature gas production phenomena of the battery, and ensures an excellent level of the first-cycle Coulombic efficiency, normal-temperature cycle performance, and high-temperature cycle performance of the battery.

In any embodiment, the electrolyte salt includes at least one of a first sodium salt or a second sodium salt. The first sodium salt includes one or more of sodium hexafluorophosphate, sodium tetrafluoroborate, sodium hexafluoroarsenate, or sodium trifluoroacetate. An anion structure of the second sodium salt includes at least one of structures represented by Formula I and Formula II:

Formula I

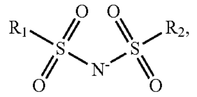

Formula II

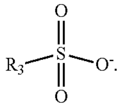

In the formulas above, $R^1$, $R^2$, and $R^3$ each independently are fluorine or a $C_1$ to $C_6$ fluoroalkyl.

The electrolyte solution includes a first sodium salt or a second sodium salt, so that the amount of gas produced by the battery at high temperature is low.

In any embodiment, based on a total mass of the electrolyte solution, a mass percent of the first sodium salt in the electrolyte solution is 2% to 40%.

The first sodium salt at an appropriate mass percent ensures that the metal ions can be reversibly deposited and exfoliated at the negative electrode, and is especially suitable for an anode-free sodium battery. In addition, the first sodium salt at an appropriate mass percent endows the electrolyte solution with an appropriate viscosity and an excellent ionic conductivity, and can improve the first-cycle Coulombic efficiency and normal-temperature cycle performance of the battery, and reduce the high-temperature gas production phenomena of the battery.

In any embodiment, the second sodium salt includes one or more of sodium triflate, sodium bis(fluorosulfonyl)imide, or sodium bis(trifluoromethanesulfonyl)imide.

The anions in the second sodium salt can be reduced on the surface of the negative electrode to generate a sulfur-containing compound and a nitrogen-containing compound. The sulfur-containing compound and the nitrogen-containing compound can effectively passivate the negative electrode, further reduce the side reactions between the negative electrode and the electrolyte solution, improve the high-temperature cycle performance of the battery, reduce the high-temperature gas production phenomena of the battery, and improve the electrochemical performance and safety performance of the battery.

In any embodiment, based on a total mass of the electrolyte solution, a mass percent of the second sodium salt in the electrolyte solution is 1% to 10%.

The second sodium salt at an appropriate mass percent helps to form a structurally stable and uniformly distributed SEI, improves the high-temperature cycle performance of the battery, and reduces the high-temperature gas production phenomena of the battery.

In any embodiment, a viscosity of the electrolyte solution at 25° C. is less than 1300 mPa·s.

An appropriate viscosity of the electrolyte solution not only ensures an excellent ionic conductivity of the electrolyte solution, but also ensures that the electrolyte solution is highly infiltrative to the electrode, thereby making the battery excellent in both electrochemical performance and safety performance.

A second aspect of this application provides a method for preparing a secondary battery electrolyte solution. The method includes the following steps:

adding an additive and a cyclic ether compound into a composition containing an electrolyte salt and a solvent, where the additive is a Lewis acid or a Lewis acid precursor; and performing in-situ polymerization for at least 24 hours to obtain the secondary battery electrolyte solution.

An existing Lewis acid or a Lewis acid generated from a Lewis acid precursor triggers in-situ polymerization of the cyclic ether compound to in-situ generate a polyether distributed uniformly in the electrolyte solution. The polyether in the electrolyte solution provides a polymer framework, reduces the kinetic activity of solvent molecules in the electrolyte solution, reduces direct contact between a positive or negative electrode and the solvent, suppresses the gas production of the secondary battery during high-temperature cycling, alleviates the high-temperature gas production phenomena of the battery, and improves safety performance of the battery at high temperature.

In any embodiment, the additive includes one or more of lithium hexafluorophosphate, lithium tetrafluoroborate, lithium perchlorate, or lithium difluoro(oxalato)borate.

Under specified conditions, the lithium hexafluorophosphate, lithium tetrafluoroborate, lithium perchlorate, and lithium difluoro(oxalato)borate can generate a Lewis acid used for initiating the polymerization of the cyclic ether compound to generate a polyether. In addition, the additive can provide lithium ions in a specified amount. The lithium ions can improve the normal-temperature cycle performance and high-temperature cycle performance of the battery, and reduce the high-temperature gas production phenomena of the battery.

In any embodiment, the additive includes one or two of lithium hexafluorophosphate or lithium tetrafluoroborate.

The appropriate additive can improve the normal-temperature cycle performance and high-temperature cycle performance of the battery, and reduce the high-temperature gas production phenomena of the battery.

In any embodiment, based on a total mass of the electrolyte solution, a mass percent of the added additive is 1% to 10%.

The additive added at an appropriate mass percent endows the electrolyte solution with an appropriate viscosity and high ionic conductivity, makes the battery excellent in first-cycle performance, and reduces the amount of gas produced at high temperature, thereby making the battery excellent in electrochemical performance and safety performance and broadening the temperature range in which the battery is applicable.

In any embodiment, based on a total mass of the electrolyte solution, a mass percent of the added additive is 2% to 6%.

The additive added at an appropriate mass percent can improve the first-cycle Coulombic efficiency, normal-temperature cycle performance, and high-temperature cycle performance of the battery, and reduce the high-temperature gas production phenomena of the battery.

In any embodiment, the cyclic ether compound includes one or more of 1,3-dioxolane, ethylene glycol diglycidyl ether, 1,4-butanediol glycidyl ether, 1,2,3,4-diepoxybutane, tetrahydrofuran, methyltetrahydrofuran, 1,4-dioxane, or tetrahydropyran.

The ring-opening polymerization reaction of the appropriate cyclic ether compound occurs under mild conditions, thereby facilitating the in-situ polymerization reactions. The polyether generated at an appropriate mass percent endows the electrolyte solution with an appropriate viscosity and high ionic conductivity, makes the battery excellent in first-cycle Coulombic efficiency, normal-temperature cycle performance, and high-temperature cycle performance, and reduces the amount of gas produced at high temperature, thereby making the battery excellent in electrochemical performance and safety performance, and broadening the temperature range in which the battery is applicable.

In any embodiment, the cyclic ether compound includes one or more of 1,3-dioxolane, tetrahydrofuran, 1,4-dioxane, or tetrahydropyran.

In any embodiment, based on a total volume of the solvent in the electrolyte solution, a volume content of the added cyclic ether compound is ⅕ to 5.

The cyclic ether compound at an appropriate volume content makes the electrolyte solution contain a polyether at an appropriate mass percent, ensures that the electrolyte solution is of an appropriate viscosity and excellent ionic conductivity, reduces the high-temperature gas production phenomena of the battery, and ensures an excellent level of the first-cycle Coulombic efficiency, normal-temperature cycle performance, and high-temperature cycle performance of the battery.

In any embodiment, based on a total volume of the solvent in the electrolyte solution, a volume content of the added cyclic ether compound is ⅓ to 3.

The cyclic ether compound at an appropriate volume content makes the electrolyte solution contain a polyether at an appropriate mass percent, ensures that the electrolyte solution is of an excellent viscosity and ionic conductivity, further reduces the high-temperature gas production phenomena of the battery, and ensures an excellent level of the first-cycle Coulombic efficiency, normal-temperature cycle performance, and high-temperature cycle performance of the battery.

A third aspect of this application provides a secondary battery. The secondary battery includes an electrolyte solution. The electrolyte solution includes the electrolyte solution according to the first aspect or an electrolyte solution prepared by the preparation method according to the second aspect of this application.

In any embodiment, the secondary battery includes at least one of a sodium-ion battery or a lithium-ion battery.

In any embodiment, the secondary battery is an anode-free sodium metal battery.

In the anode-free sodium battery, the metallic sodium on the negative electrode is generated during subsequent cycling. The sodium-ion battery is voltage-free until the first charge. Therefore, the sodium-ion battery can be stored for a long period without self-discharge. Even if the battery is short-circuited, no current is generated, thereby further improving the safety of the battery.

In any embodiment, the secondary battery includes a negative electrode plate. The negative electrode plate includes a negative current collector and an undercoat formed on at least a part of a surface of the negative current collector.

The conductive undercoat is characterized by a low metal nucleation potential, and can effectively improve the deposition/dissolution performance of the metal, and also alleviate the huge volume change caused by the deposition/dissolution of the metal to the battery cell, stabilize the structure of the battery cell, thereby improving the high-temperature cycle performance of the battery and reducing the high-temperature gas production phenomena of the battery.

In any embodiment, the undercoat is a conductive carbon coating layer.

The conductive carbon coating layer can effectively reduce the overpotential of the metal deposition, suppress formation of metal dendrites, improve the normal-temperature cycle performance and high-temperature cycle performance of the battery, and reduce the high-temperature gas production phenomena of the battery.

In any embodiment, an areal density of the conductive carbon coating layer is 5 to 50 $g/m^2$.

An appropriate areal density of the undercoat can optimize the metal deposition effect, improve the high-temperature cycle performance and normal-temperature cycle performance of the battery, and reduce the high-temperature gas production phenomena of the battery. In addition, an appropriate areal density of the undercoat can increase the energy density of the battery and meet the use requirements of the battery.

A fourth aspect of this application provides a battery module. The battery module includes the secondary battery according to the third aspect of this application.

A fifth aspect of this application provides a battery pack. The battery pack includes at least one of the secondary battery according to the third aspect or the battery module according to the fourth aspect.

A sixth aspect of this application provides an electrical device. The electrical device includes at least one of the secondary battery according to the third aspect, the battery module according to the fourth aspect, or the battery pack according to the fifth aspect.

LIST OF REFERENCE NUMERALS

Figure 1:
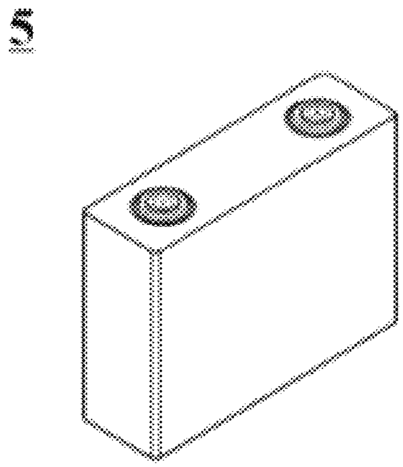
FIG. 1 is a schematic diagram of a secondary battery according to an embodiment of this application.

1. battery pack; 2. upper box; 3. lower box; 4. battery module; 5. secondary battery; 51. housing; 52. electrode assembly; 53. cover plate.

DETAILED DESCRIPTION OF EMBODIMENTS

The following describes and discloses in detail a positive active material and a preparation method thereof, a positive electrode plate, a secondary battery, a battery module, a battery pack, and an electrical device according to this application with due reference to drawings. However, unnecessary details may be omitted in some cases. For example, a detailed description of a well-known matter or repeated description of an essentially identical structure may be omitted. That is intended to prevent the following descriptions from becoming unnecessarily lengthy, and to facilitate understanding by a person skilled in the art. In addition, the drawings and the following descriptions are intended for a person skilled in the art to thoroughly understand this application, but not intended to limit the subject-matter set forth in the claims.

A "range" disclosed herein is defined in the form of a lower limit and an upper limit. A given range is defined by a lower limit and an upper limit selected. The selected lower and upper limits define the boundaries of a particular range. A range so defined may be inclusive or exclusive of the end values, and a lower limit of one range may be arbitrarily combined with an upper limit of another range to form a range. For example, if a given parameter falls within a range of 60 to 120 and a range of 80 to 110, it is expectable that the parameter may fall within a range of 60 to 110 and a range of 80 to 120 as well. In addition, if lower-limit values 1 and 2 are listed, and if upper-limit values 3, 4, and 5 are listed, the following ranges are all expectable: 1 to 3, 1 to 4, 1 to 5, 2 to 3, 2 to 4, and 2 to 5. Unless otherwise specified herein, a numerical range "a to b" is a brief representation of a combination of any real numbers between a and b inclusive, where both a and b are real numbers. For example, a numerical range "0 to 5" herein means all real numbers recited between 0 and 5 inclusive, and the expression "0 to 5" is just a brief representation of a combination of such numbers. In addition, a statement that a parameter is an integer greater than or equal to 2 is equivalent to a disclosure that the parameter is an integer such as 2, 3, 4, 5, 6, 7, 8, 9, 10, 11, 12, and so on.

Unless otherwise expressly specified herein, any embodiments and optional embodiments hereof may be combined with each other to form a new technical solution.

Unless otherwise expressly specified herein, any technical features and optional technical features hereof may be combined with each other to form a new technical solution.

Unless otherwise expressly specified herein, all steps described herein may be performed in sequence or at random, and in some embodiments in sequence. For example, that the method includes steps (a) and (b) indicates that the method may include steps (a) and (b) performed in sequence, or steps (b) and (a) performed in sequence. For example, that the method may further include step (c) indicates that step (c) may be added into the method in any order. For example, the method may include steps (a), (b), and (c), or may include steps (a), (c), and (b), or may include steps (c), (a), and (b), and so on.

Unless otherwise expressly specified herein, "include" and "comprise" mentioned herein mean open-ended inclusion. For example, the terms "include" and "comprise" may mean that other items that are not recited may or may not also be included or comprised.

Unless otherwise expressly specified, the term "or" used herein is inclusive. For example, the expression "A or B" means "A alone, B alone, or both A and B". More specifically, all and any of the following conditions satisfy the condition "A or B": A is true (or existent) and B is false (or absent); A is false (or absent) and B is true (or existent); and, both A and B are true (or existent).

When the secondary battery is used or stored at high temperature, a positive electrode and a negative electrode react with an electrolyte solution more actively. The amount of heat released from the reactions increases enormously, giving rise to a large amount of gases and making the battery prone to expand in volume. In severe cases, this may lead to a short-circuit inside the battery, and impair the safety performance of the battery severely.

[Electrolyte Solution]

In view of the above situation, this application provides an electrolyte solution. The electrolyte solution includes an electrolyte salt, a solvent, and a polyether.

As used herein, the term "electrolyte solution" means a composition that establishes an ion-conducting channel between the positive electrode and the negative electrode inside the battery while blocking electronic conductors. The electrolyte solution includes a solvent and an electrolyte salt. The electrolyte solution herein may be in any form, such as a low-viscosity flowable liquid or a high-viscosity gel.

As used herein, the term "electrolyte salt" means a compound formed from metal cations and anions and capable of conducting electricity in an aqueous solution or in a molten state.

As used herein, the term "polyether" means a type of macromolecule with an ether (—O—C—O—) linkage existent in the main chain of the polymer, including polyalkylene oxide, aromatic polyether, epoxy resin, acetal resin, polyethersulfone, and polyetherimide. Understandably, the degree of polymerization of the polyether is not limited herein. The polyether may be either a polymer or an oligomer.

In some embodiments, the polyether is a polyalkylene oxide.

As used herein, the term "polyalkylene oxide" means a polymer formed by homopolymerizing or copolymerizing alkylene oxide monomers by opening the ring of the monomer under the action of a catalyst. As examples, polyalkylene oxides include polyethylene oxide, polypropylene oxide, polytetrahydrofuran, polytetrahydropyran, poly(1,3-dioxolane), poly(1,4-dioxane), and poly(ethylene oxide-co-propylene oxide).

The polyether added in the electrolyte solution provides a polymer framework and serves to bind the solvent molecules, thereby reducing the kinetic activity of the solvent molecules in the electrolyte solution, reducing direct contact between the positive or negative electrode and the solvent, reducing the possibility of chemical reactions between the positive or negative electrode and the solvent, restraining the secondary battery from producing gas during high-temperature cycling, and improving the anti-gassing capability of the secondary battery at high-temperature and the safety performance of the secondary battery at high temperature.

In some embodiments, the electrolyte solution includes lithium ions. A mass percent of the lithium ions is 0.05% to 0.46% based on a total mass of the electrolyte solution. In some embodiments, the mass percent of the lithium ions is optionally any one of 0.05% to 0.1%, 0.05% to 0.2%, 0.05% to 0.3%, 0.05% to 0.4%, 0.4% to 0.46%, 0.1% to 0.2%, 0.1% to 0.3%, 0.1% to 0.4%, 0.1% to 0.46%, 0.2% to 0.3%, 0.2% to 0.4%, 0.2% to 0.46%, 0.3% to 0.4%, 0.3% to 0.46%, based on the total mass of the electrolyte solution.

The lithium ions at an appropriate mass percent can improve the normal-temperature cycle performance and high-temperature cycle performance of the battery, and reduce the high-temperature gas production phenomena of the battery.

Using a sodium metal battery as an example, the introduced lithium ions can also effectively suppress the growth of sodium dendrites during sodium metal deposition. During charging of the sodium-metal battery, the negative electrode undergoes an electrochemical reaction in which the sodium ions are reduced to sodium metal by gaining electrons. At the beginning of the reaction, the sodium metal is unevenly deposited on the surface of the current collector to form dendrites. The tips of the dendrites possess a relatively high density of negative charges due to a tip effect. Both a lithium ion and a sodium ion are positive monovalent cations, and carry a single positive charge. However, the lithium ions are smaller in radius, and therefore, possess a higher density of positive charges, and are distributed at the tip of the dendrites preferentially over the sodium ions, thereby effectively reducing further deposition of the sodium ions at the tip of the sodium dendrites, suppressing the growth of the sodium dendrites, and in turn, greatly improving the cycle performance of the sodium-metal battery.

In some embodiments, the mass percent of the polyether is 10% to 70% based on a total mass of the electrolyte solution. In some embodiments, the mass percent of the polyether is optionally any one of 10% to 20%, 10% to 30%, 10% to 40%, 10% to 50%, 10% to 60%, 10% to 70%, 20% to 30%, 20% to 40%, 20% to 50%, 20% to 60%, 20% to 70%, 30% to 40%, 30% to 50%, 30% to 60%, 30% to 70%, 40% to 50%, 40% to 60%, 40% to 70%, 50% to 60%, 50% to 70%, or 60% to 70%, based on the total mass of the electrolyte solution.

The polyether at an appropriate mass percent endows the electrolyte solution with an appropriate viscosity and excellent ionic conductivity, makes the battery excellent in first-performance, and reduces the amount of gas produced by the battery at high temperature, thereby broadening the temperature range in which the battery is applicable.

In some embodiments, the polyether is generated by in-situ polymerization from a cyclic ether compound in the electrolyte solution as initiated by a Lewis acid.

As used herein, the term "cyclic ether compound" means a product of substituting hydrogen in an alcoholic or phenolic hydroxyl with a hydrocarbon group, so that the carbon atom and the oxygen atom in the product form a ring structure. As examples, the cyclic ether compound is optionally a three-, four-, five-, or six-membered ring containing an ether bond, including but not limited to, ethylene oxide, propylene oxide, butylene oxide, tetrahydrofuran, tetrahydropyran, 1,3-dioxolane, 1,4-dioxane, ethylene glycol diglycidyl ether, 1,4-butanediol glycidyl ether, 1,2,3,4-diepoxy butane, and methyl tetrahydrofuran.

As used herein, the term "Lewis acid" means a molecule, ion, or atomic group capable of accepting a foreign electron pair, that is, an electron pair acceptor. Main Lewis acids include: metal cations in a coordination compound; some molecules and ions with central atoms in which a coordination sphere is expandable to accept more electron pairs although the central atoms fulfill an 8-electron structure; some molecules and ions capable of accepting more electron pairs through valence electron rearrangement although the centers of the molecules and ions fulfill an 8-electron structure; and some closed-shell molecules capable of accommodating foreign electron pairs through their antibonding molecular orbitals.

In some embodiments, the Lewis acid may be a cation or a metal ion, for example, a sodium ion, an alkyl cation, or a nitro cation.

In some embodiments, the Lewis acid may be an electron-deficient compound, for example, boron trifluoride, phosphorus pentafluoride, aluminum trichloride, or sulfur trioxide.

As used herein, the term "in-situ polymerization" means a polymerization reaction of reactive monomers in an electrolyte solution to form a polymer.

In some embodiments, the Lewis acid is added directly into the electrolyte solution in the form of an additive. In some embodiments, the Lewis acid is generated by decomposing an additive in the electrolyte solution.

The polyether generated in-situ polymerization can effectively overcome the problem of poor solubility of a polymer in the electrolyte solution. Through in-situ polymerization, the polyether is uniformly distributed in the electrolyte solution, thereby increasing the direct interactions with the solvent molecules in the electrolyte solution, and in turn, reducing the direct contact between the solvent molecule in the electrolyte solution and the positive or negative electrode, and effectively alleviating the high-temperature gas production phenomena of the battery. Moreover, the in-situ polymerization can occur in-situ in a secondary battery system after the electrolyte solution is injected. This effectively prevents the added polyether from causing an overly high viscosity of the electrolyte solution and difficulty of assembling and processing of the battery, and optimizes the battery performance and improves the production efficiency without changing the original production process of the battery.

In some embodiments, the Lewis acid is derived from an additive in the electrolyte solution. The additive includes one or more of lithium hexafluorophosphate, lithium tetrafluoroborate, lithium perchlorate, or lithium difluoro(oxalato)borate.

As used herein, the term "additive" means a small-amount constituent of the electrolyte solution, and may be a gas, liquid, or solid. Conceptually, the only difference between the additive, solvent, and electrolyte salt lies in the content thereof in the electrolyte solution.

Under specified conditions, the lithium hexafluorophosphate, lithium tetrafluoroborate, lithium perchlorate, and lithium difluoro(oxalato)borate are decomposed to generate a Lewis acid used for initiating the polymerization of the cyclic ether compound to generate a polyether. In addition, the above lithium salts can provide lithium ions in a specified amount. The lithium ions can improve the normal-temperature cycle performance and high-temperature cycle performance of the battery, and reduce the high-temperature gas production phenomena of the battery.

In some embodiments, the lithium hexafluorophosphate, lithium tetrafluoroborate, lithium perchlorate, and lithium difluoro(oxalato)borate are pyrolyzed at a specified temperature to generate a Lewis acid.

In some embodiments, the lithium hexafluorophosphate is pyrolyzed to generate products including Lewis acids phosphorus pentafluoride and lithium fluoride.

In some embodiments, the lithium tetrafluoroborate is pyrolyzed to generate products including Lewis acids boron trifluoride and lithium fluoride.

In some embodiments, the lithium perchlorate is pyrolyzed to generate products including a Lewis acid lithium chloride.

In some embodiments, the lithium difluoro(oxalato)borate is pyrolyzed to generate products including Lewis acids boron trifluoride and lithium fluoride.

In some embodiments, the Lewis acid is derived from an additive in the electrolyte solution. The additive includes one or two of lithium hexafluorophosphate or lithium tetrafluoroborate.

The lithium hexafluorophosphate and the lithium tetrafluoroborate are easily pyrolyzed under mild conditions, thereby facilitating the in-situ polymerization in the electrolyte system and ensuring the reliability of the reaction. The appropriate additive can improve the normal-temperature cycle performance and high-temperature cycle performance of the battery, and reduce the amount of gas produced by the battery in a high-temperature environment.

In some embodiments, based on a total mass of the electrolyte solution, a mass percent of the added additive is 1% to 10%. In some embodiments, based on the total mass of the electrolyte solution, the mass percent of the added additive is optionally any one of 1% to 2%, 1% to 3%, 1% to 4%, 1% to 5%, 1% to 6%, 1% to 7%, 1% to 8%, 1% to 9%, 1% to 10%, 2% to 3%, 2% to 4%, 2% to 5%, 2% to 6%, 2% to 7%, 2% to 8%, 2% to 9% 2% to 10%, 3% to 4%, 3% to 5%, 3% to 6%, 3% to 7%, 3% to 8%, 3% to 9%, 3% to 10%, 4% to 5%, 4% to 6%, 4% to 7%, 4% to 8%, 4% to 9%, 4% to 10%, 5% to 6%, 5% to 7%, 5% to 8%, 5% to 9%, 5% to 10%, 6% to 7%, 6% to 8%, 6% to 9%, 6% to 10%, 7% to 8%, 7% to 9%, 7% to 10%, 8% to 9%, 8% to 10%, or 9% to 10%.

The additive added at an appropriate mass percent endows the electrolyte solution with an appropriate viscosity and high ionic conductivity, makes the battery excellent in first-cycle Coulombic efficiency, normal-temperature cycle performance, and high-temperature cycle performance, and reduces the amount of gas produced at high temperature, thereby further broadening the temperature range in which the battery is applicable.

In some embodiments, based on a total mass of the electrolyte solution, a mass percent of the added additive is 2% to 6%. In some embodiments, based on the total mass of the electrolyte solution, the mass percent of the added additive is optionally any one of 2% to 3%, 2% to 4%, 2% to 5%, 2% to 6%, 3% to 4%, 3% to 5%, 3% to 6%, 4% to 5%, 4% to 6%, or 5% to 6%.

The additive added at an appropriate mass percent can improve the first-cycle Coulombic efficiency, normal-temperature cycle performance, and high-temperature cycle performance of the battery, and reduce the high-temperature gas production phenomena of the battery.

In some embodiments, the cyclic ether compound includes one or more of 1,3-dioxolane, ethylene glycol diglycidyl ether, 1,4-butanediol glycidyl ether, 1,2,3,4-diepoxybutane, tetrahydrofuran, methyltetrahydrofuran, 1,4-dioxane, or tetrahydropyran.

The appropriate cyclic ether compound is easy to polymerize by means of ring opening, and facilitates the in-situ polymerization reactions in the electrolyte solution. The polyether generated at an appropriate mass percent endows the electrolyte solution with an appropriate viscosity and high ionic conductivity, makes the battery excellent in first-cycle Coulombic efficiency, normal-temperature cycle performance, and high-temperature cycle performance, and reduces the amount of gas produced at high temperature, thereby further broadening the temperature range in which the battery is applicable.

In some embodiments, the cyclic ether compound includes one or more of 1,3-dioxolane, tetrahydrofuran, 1,4-dioxane, or tetrahydropyran.

The cyclic polymers are easy to react in the form of ring-opening reactions as initiated by the Lewis acid at room temperature, thereby making the in-situ polymerization reactions highly reliable. A reaction material can be added in a process of injecting the electrolyte solution, and the in-situ polymerization reaction can be completed before shipment of the battery from the factory, without requiring additional time or processes, thereby further improving the production efficiency.

In some embodiments, the solvent includes a chain ether compound.

As used herein, the term "chain ether compound" means a product of substituting hydrogen in an alcoholic or phenolic hydroxyl with a hydrocarbon group, so that the carbon atom and the oxygen atom in the product are linked to form a chain structure.

The chain ether compound endows the electrolyte solution with an appropriate viscosity and excellent ionic conductivity. In addition, the chain ether compound includes the same ether bond as the polyether, thereby improving the compatibility of the electrolyte system, and homogenizing the distribution of the polyether in the electrolyte solution. This helps to improve the first-cycle Coulombic efficiency, normal-temperature cycle performance, and high-temperature cycle performance of the battery, reduces the high-temperature gas production phenomena of the battery, improves the electrochemical performance and safety performance of the battery, and broadens the temperature range in which the battery is applicable.

The molecules of the chain ether compound can build a stable electrode/electrolyte interface on the surface of a negative electrode of a battery such as a sodium metal battery (including an anode-free battery), a carbon material negative electrode, or another non-carbon negative electrode, form a stable solid electrolyte interface (SEI), alleviate electrochemical polarization, and improve the first-cycle Coulombic efficiency and high-temperature cycle performance of the battery.

Using a sodium metal battery as an example, the ether solvent is highly compatible with an alkali metal negative electrode, and can effectively passivate the sodium metal, form a thin, uniform and dense SEI film on the surface of sodium metal, further prevent the formation of sodium dendrites, and prevent the SEI film from thickening caused by growth and evolution of the sodium dendrites and from affecting ion conduction.

As used herein, the term "anode-free battery" means a battery that uses a current collector as a negative electrode during assembling. During charging of an anode-free battery, the metal ions are deposited onto the current collector to form a metal negative electrode.

In some embodiments, the solvent includes one or more of ethylene glycol dimethyl ether, diethylene glycol dimethyl ether, triethylene glycol dimethyl ether, tetraethylene glycol dimethyl ether, ethylene glycol diethyl ether, or ethylene glycol dibutyl ether.

In some embodiments, based on a total volume of the solvent in the electrolyte solution, a volume content of the added cyclic ether compound is ⅕ to 5. In some embodiments, based on a total volume of the solvent in the electrolyte solution, the volume content of the added cyclic ether compound is optionally any one of ¼ to 4, 2/7 to 3.5, ⅓ to 3, ⅖ to 2.5, ½ to 2, or ⅔ to 1.5.

The cyclic ether compound at an appropriate volume content ensures a smooth progress of the ring-opening reactions, makes the electrolyte solution contain a polyether at an appropriate mass percent, ensures that the electrolyte solution is of an appropriate viscosity and excellent ionic conductivity, reduces the high-temperature gas production phenomena of the battery, and ensures an excellent level of the first-cycle Coulombic efficiency, normal-temperature cycle performance, and high-temperature cycle performance of the battery.

In some embodiments, based on a total volume of the solvent in the electrolyte solution, a volume content of the added cyclic ether compound is ⅓ to 3. In some embodiments, based on a total volume of the solvent in the electrolyte solution, a volume content of the added cyclic ether compound is optionally any one of ⅓ to 3, ⅖ to 2.5, ½ to 2, or ⅔ to 1.5.

The cyclic ether compound at an appropriate volume content ensures a smooth progress of the ring-opening reactions, makes the electrolyte solution contain a polyether at an appropriate mass percent, ensures that the electrolyte solution is of an appropriate viscosity and excellent ionic conductivity, further reduces the high-temperature gas production phenomena of the battery, and ensures an excellent level of the first-cycle Coulombic efficiency, normal-temperature cycle performance, and high-temperature cycle performance of the battery. In some embodiments, the electrolyte salt includes at least one of a first sodium salt or a second sodium salt. The first sodium salt includes one or more of sodium hexafluorophosphate, sodium tetrafluoroborate, sodium hexafluoroarsenate, or sodium trifluoroacetate. An anion structure of the second sodium salt includes at least one of structures represented by Formula I and Formula II:

Formula I

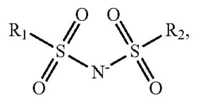

Formula II

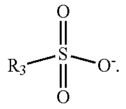

In the formulas above, $R^1$, $R^2$, and $R^3$ each independently are fluorine or a $C_1$ to $C_6$ fluoroalkyl.

As used herein, the term "$C_1$ to $C_6$ fluoroalkyl" means an alkane in which a hydrogen atom is substituted by at least one fluorine atom and in which one to six carbon atoms are contained.

In some embodiments, the second sodium salt includes one or more of sodium fluorosulfonate, sodium triflate, sodium bis(fluorosulfonyl)imide, sodium bis(trifluoromethanesulfonyl)imide, or sodium, (fluorosulfonyl)(trifluoromethanesulfonyl)imide.

In some embodiments, the second sodium salt includes one or two of sodium bis(fluorosulfonyl)imide or sodium bis(trifluoromethanesulfonyl)imide.

The bonding force between an anion and a sodium ion in the first sodium salt is relatively weak, thereby facilitating fast deposition and exfoliation of metal ions, and improving the kinetic performance of the battery. Especially, in an anode-free battery, the second sodium salt can effectively ensure a high level of the capacity and cycle performance of the battery. The second sodium salt can optimize the deposition and exfoliation of metal ions to improve the cycle performance of the secondary battery. In addition, an appropriate concentration of the first sodium salt and the second sodium salt endows the electrolyte solution with an appropriate viscosity and an excellent ionic conductivity, thereby improving the electrochemical performance of the secondary battery as a whole.

The anions in the second sodium salt possess a strong force of bonding to the sodium ions, and are more readily available for participating in forming a solvation structure of the electrolyte salt, and are prone to contact the surface of the negative electrode along with the deposition of the metal ions and be reduced on the surface of the negative electrode to generate an SEI that mainly contains a sulfide and a nitride, thereby enormously improving the structural stability and uniformity of the SEI on the surface of the secondary battery. On the one hand, the SEI containing a large amount of sulfides and nitrides is not prone to re-decompose or regenerate, thereby reducing the consumption of metal inside the battery and improving the high-temperature cycle performance of the secondary battery. On the other hand, the structurally stable and uniformly distributed SEI reduces the direct contact between the electrolyte solution and the metal, thereby reducing the side reactions between the electrolyte solution and the metal, restraining the secondary battery from generating gas during high-temperature cycling, and alleviating the high-temperature gas production phenomena of the secondary battery.

In some embodiments, the electrolyte salt includes the first sodium salt.

The first sodium salt included in the electrolyte solution makes the battery excellent in first-cycle Coulombic efficiency, normal-temperature cycle performance, and high-temperature cycle performance, and reduces the amount of gas produced by the battery at high temperature.

In some embodiments, the electrolyte salt includes the second sodium salt.

The second sodium salt included in the electrolyte solution reduces the amount of gas produced by the battery at high temperature.

In some embodiments, the electrolyte salt includes both the first sodium salt and the second sodium salt.

The first sodium salt and the second sodium salt included in the electrolyte solution not only ensure that the metal ions can be deposited and exfoliated reversibly, but also ensure formation of a structurally stable and uniformly distributed SEI, thereby improving the high-temperature cycle performance and anti-gassing capability of the secondary battery.

In some embodiments, based on a total mass of the electrolyte solution, a mass percent of the first sodium salt in the electrolyte solution is 2% to 40%. In some embodiments, based on the total mass of the electrolyte solution, the mass percent of the first sodium salt in the electrolyte solution is optionally any one of 2% to 10%, 2% to 20%, 2% to 30%, 10% to 20%, 10% to 30%, 10% to 40%, 20% to 30%, 20% to 40%, or 30% to 40%.

The first sodium salt at an appropriate mass percent not only ensures that the metal ions can be deposited and exfoliated reversibly, but also endows the electrolyte solution with an appropriate viscosity and an excellent ionic conductivity, thereby improving the first-cycle Coulombic efficiency and normal-temperature cycle performance of the battery, and reducing the high-temperature gas production phenomena of the battery.

In some embodiments, based on a total mass of the electrolyte solution, a mass percent of the second sodium salt in the electrolyte solution is 1% to 10%. In some embodiments, based on the total mass of the electrolyte solution, the mass percent of the second sodium salt in the electrolyte solution is optionally any one of 1% to 2%, 1% to 4%, 1% to 6%, 1% to 8%, 1% to 10%, 2% to 4%, 2% to 6%, 2% to 8%, 2% to 10%, 4% to 6%, 6% to 8%, 6% to 10%, or 8% to 10%.

The second sodium salt at an appropriate mass percent helps to form a structurally stable and uniformly distributed SEI, improves the high-temperature cycle performance of the battery, and reduces the high-temperature gas production phenomena of the battery.

In some embodiments, a viscosity of the electrolyte solution at 25° C. is less than 1300 mPa·s. In some embodiments, the viscosity of the electrolyte solution at 25° C. is optionally any one of 1.5 mPa·s to 200 mPa·s, 1.5 mPa·s to 400 mPa·s, 1.5 mPa·s to 600 mPa·s, 1.5 mPa·s to 800 mPa·s, 1.5 mPa·s to 1000 mPa·s, 1.5 mPa·s to 1200 mPa·s, 200 mPa·s to 400 mPa·s, 200 mPa·s to 600 mPa·s, 200 mPa·s to 800 mPa·s, 200 mPa·s to 1000 mPa·s, 200 mPa·s to 1300 mPa·s, 400 mPa·s to 600 mPa·s, 400 mPa·s to 800 mPa·s, 400 mPa·s to 1000 mPa·s, 400 mPa·s to 1300 mPa·s, 600 mPa·s to 800 mPa·s, 600 mPa·s to 1000 mPa·s, 600 mPa·s to 1300 mPa·s, 800 mPa·s to 1000 mPa·s, or 800 mPa·s to 1300 mPa·s.

The viscosity of the electrolyte solution may be tested in any well-known manner. As an example, the viscosity of the electrolyte solution at 25° C. is determined by using a rheometer.

The electrolyte solution of an appropriate viscosity makes the electrolyte solution excellent in ionic conductivity, and also makes the electrolyte solution highly capable of infiltrating the electrode, thereby ensuring good contact between the electrolyte solution and the electrode and improving the electrochemical performance of the battery.

In some embodiments, the electrolyte solution further includes a solvent other than the chain ether compound solvent. Non-restrictive examples of other solvents include at least one selected from vinylene carbonate, ethylene carbonate, propylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, or diethyl sulfone.

In some embodiments, the electrolyte solution may optionally include another additive capable of improving specified performance indicators of the battery, for example, an additive for improving overcharge performance of the battery, or an additive for improving thermal stability of the electrolyte solution.

[Method for Preparing an Electrolyte Solution]

This application further provides a method for preparing a secondary battery electrolyte solution. The method includes the following steps: adding an additive and a cyclic ether compound into a composition containing an electrolyte salt and a solvent, where the additive is a Lewis acid or a Lewis acid precursor; and performing in-situ polymerization for at least 24 hours to obtain a secondary battery electrolyte solution.

As used herein, the term "Lewis acid precursor" means a chemical substance from which a Lewis acid can be generated under specified conditions. The conditions for triggering the generation of a Lewis acid from a Lewis acid precursor may be pyrolysis, chemical reaction, or photoinitiation.

In some embodiments, the polymerization temperature is any one of 5° C., 10° C., 15° C., 20° C., 25° C., 30° C., 35° C., 40° C., 45° C., 50° C., 55° C., or 60° C.

In some embodiments, the polymerization duration is any one of 24 hours, 36 hours, 48 hours, 60 hours, or 72 hours.

The polymerization conditions are mild, and the reaction duration is controllable, thereby making the in-situ polymerization cost-effective and efficient, and facilitating mass production in industrial applications.

An existing Lewis acid or a Lewis acid generated from a Lewis acid precursor triggers in-situ polymerization of the cyclic ether compound to generate a polyether distributed uniformly. The generated polyether provides a polymer framework and serves to bind the solvent molecules, thereby reducing the kinetic activity of the solvent molecules in the electrolyte solution, reducing direct contact between the positive or negative electrode and the solvent, reducing the possibility of chemical reactions between the positive or negative electrode and the solvent, restraining the secondary battery from producing gas during high-temperature cycling, and improving the anti-gassing capability of the secondary battery at high-temperature and the safety performance of the secondary battery at high temperature.

In some embodiments, the additive includes one or more of lithium hexafluorophosphate, lithium tetrafluoroborate, lithium perchlorate, or lithium difluoro(oxalato)borate.

Under s conditions, the lithium hexafluorophosphate, lithium tetrafluoroborate, lithium perchlorate, and lithium difluoro(oxalato)borate are decomposed to generate a Lewis acid used for initiating the polymerization of the cyclic ether compound to generate a polyether. In addition, the above lithium salts can provide lithium ions in a specified amount. The lithium ions can improve the normal-temperature cycle performance and high-temperature cycle performance of the battery, and reduce the high-temperature gas production phenomena of the battery.

In some embodiments, the Lewis acid is derived from an additive in the electrolyte solution. The additive includes one or two of lithium hexafluorophosphate or lithium tetrafluoroborate.

The lithium hexafluorophosphate and the lithium tetrafluoroborate are easily pyrolyzed, thereby facilitating the in-situ polymerization and ensuring the reliability of the reaction.

The appropriate additive can improve the normal-temperature cycle performance and high-temperature cycle performance of the battery, and reduce the high-temperature gas production phenomena of the battery.

In some embodiments, based on a total mass of the electrolyte solution, a mass percent of the added additive is 1% to 10%. In some embodiments, based on the total mass of the electrolyte solution, the mass percent of the added additive is optionally any one of 1% to 2%, 1% to 3%, 1% to 4%, 1% to 5%, 1% to 6%, 1% to 7%, 1% to 8%, 1% to 9%, 1% to 10%, 2% to 3%, 2% to 4%, 2% to 5%, 2% to 6%, 2% to 7%, 2% to 8%, 2% to 9% 2% to 10%, 3% to 4%, 3% to 5%, 3% to 6%, 3% to 7%, 3% to 8%, 3% to 9%, 3% to 10%, 4% to 5%, 4% to 6%, 4% to 7%, 4% to 8%, 4% to 9%, 4% to 10%, 5% to 6%, 5% to 7%, 5% to 8%, 5% to 9%, 5% to 10%, 6% to 7%, 6% to 8%, 6% to 9%, 6% to 10%, 7% to 8%, 7% to 9%, 7% to 10%, 8% to 9%, 8% to 10%, or 9% to 10%.

The additive added at an appropriate mass percent endows the electrolyte solution with an appropriate viscosity and high ionic conductivity, makes the battery excellent in first-cycle Coulombic efficiency, normal-temperature cycle performance, and high-temperature cycle performance, and reduces the amount of gas produced at high temperature, thereby further broadening the temperature range in which the battery is applicable.

In some embodiments, based on a total mass of the electrolyte solution, a mass percent of the added additive is 2% to 6%. In some embodiments, based on the total mass of the electrolyte solution, the mass percent of the added additive is optionally any one of 2% to 3%, 2% to 4%, 2% to 5%, 2% to 6%, 3% to 4%, 3% to 5%, 3% to 6%, 4% to 5%, 4% to 6%, or 5% to 6%.

The additive added at an appropriate mass percent can improve the first-cycle Coulombic efficiency, normal-temperature cycle performance, and high-temperature cycle performance of the battery, and reduce the high-temperature gas production phenomena of the battery.

In some embodiments, the cyclic ether compound includes one or more of 1,3-dioxolane, ethylene glycol diglycidyl ether, 1,4-butanediol glycidyl ether, 1,2,3,4-diepoxybutane, tetrahydrofuran, methyltetrahydrofuran, 1,4-dioxane, or tetrahydropyran.

The appropriate cyclic ether compound is easy to polymerize by means of ring opening, and facilitates the in-situ polymerization reactions. The polyether generated at an appropriate mass percent endows the electrolyte solution with an appropriate viscosity and high ionic conductivity, makes the battery excellent in first-cycle Coulombic efficiency, normal-temperature cycle performance, and high-temperature cycle performance, and reduces the amount of gas produced at high temperature, thereby further broadening the temperature range in which the battery is applicable.

In some embodiments, the cyclic ether compound includes one or more of 1,3-dioxolane, tetrahydrofuran, 1,4-dioxane, or tetrahydropyran.

The cyclic polymers are easy to react in the form of ring-opening reactions as initiated by the Lewis acid at room temperature, thereby making the in-situ polymerization reactions highly reliable. The in-situ polymerization reaction can be completed in packaging process of the battery, without requiring additional time or processes, thereby further improving the production efficiency.

In some embodiments, based on a total volume of the solvent in the electrolyte solution, a volume content of the added cyclic ether compound is ⅕ to 5. In some embodiments, based on a total volume of the solvent in the electrolyte solution, the volume content of the added cyclic ether compound is optionally any one of ¼ to 4, 2/7 to 3.5, ⅓ to 3, ⅖ to 2.5, ½ to 2, or ⅔ to 1.5.

The cyclic ether compound at an appropriate volume content ensures an appropriate mass content of the polyether in the electrolyte solution, ensures that the electrolyte solution is of an appropriate viscosity and excellent ionic conductivity, reduces the high-temperature gas production phenomena of the battery, and ensures an excellent level of the first-cycle Coulombic efficiency, normal-temperature cycle performance, and high-temperature cycle performance of the battery.

In some embodiments, based on a total volume of the solvent in the electrolyte solution, a volume content of the added cyclic ether compound is ⅓ to 3. In some embodiments, based on a total volume of the solvent in the electrolyte solution, a volume content of the added cyclic ether compound is optionally any one of ⅓ to 3, ⅖ to 2.5, ½ to 2, or ⅔ to 1.5.

The cyclic ether compound at an appropriate volume content ensures an appropriate mass content of the polyether in the electrolyte solution, ensures that the electrolyte solution is of an appropriate viscosity and excellent ionic conductivity, reduces the high-temperature gas production phenomena of the battery, and ensures an excellent level of the first-cycle Coulombic efficiency, normal-temperature cycle performance, and high-temperature cycle performance of the battery.

[Secondary Battery]

This application further provides a secondary battery. The secondary battery includes an electrolyte solution. The electrolyte solution includes the electrolyte solution according to any one of the foregoing embodiments or an electrolyte solution prepared by the preparation method according to any one of the foregoing embodiments.

In some embodiments, the secondary battery includes at least one of a sodium-ion battery or a lithium-ion battery.

In some embodiments, the secondary battery is an anode-free sodium metal battery.

As used herein, the term "anode-free sodium metal battery" means a sodium metal battery that uses a current collector as a negative electrode during assembling. Sodium ions are deposited onto the current collector to form the sodium metal negative electrode during the charging of the anode-free sodium metal battery.

In the anode-free sodium metal battery, the metallic sodium on the negative electrode is generated during subsequent cycling. The sodium-ion battery is voltage-free until the first charge. Therefore, the sodium-ion battery can be stored for a long period without self-discharge. Even if the battery is short-circuited, no current is generated, thereby being extremely safe. Due to the use of the negative current collector alone without a negative active material on the surface of the negative current collector, the battery achieves a higher energy density.

In some embodiments, the secondary battery includes a negative electrode plate. The negative electrode plate includes a negative current collector and an undercoat formed on at least a part of a surface of the negative current collector.

The undercoat is characterized by a low metal nucleation potential, and can effectively improve the deposition/dissolution performance of the metal, and also alleviate the huge volume change caused by the deposition/dissolution of the metal to the battery cell, stabilize the structure of the battery cell, thereby improving the high-temperature cycle performance of the battery and reducing the high-temperature gas production phenomena of the battery.

In some embodiments, the negative current collector used in the negative electrode plate includes at least one of a metal foil current collector, a metal foam current collector, a metal mesh current collector, a carbon felt current collector, a carbon cloth current collector, or a carbon paper current collector. The sodium ion does not react with aluminum to form an alloy. Considering cost-effectiveness and lightweight, the sodium-ion battery can adopt an aluminum-based current collector. The aluminum-based current collector is any one of an aluminum foil, an aluminum alloy foil, or an aluminum-based composite current collector. The aluminum-based composite current collector includes a polymer base film and an aluminum foil and/or an aluminum alloy foil formed on two sides of polymer base film. Specifically, the aluminum-based composite current collector is a "sandwich" structure. The polymer base film is located in the middle and flanked by aluminum foils or flanked by aluminum alloy foils; or, the polymer base film is coated with an aluminum foil on one side and with an aluminum alloy foil on the other side. The polymer base film is any one of polyamide, polyterephthalate, polyimide, polyethylene, polypropylene, polystyrene, polyvinyl chloride, poly (acrylonitrile-co-butadiene-co-styrene), polybutanediol terephthalate, poly-p-phenylene terephthamide, polyphenylene ether, polyoxymethylene, epoxy resin, phenol-formaldehyde resin, polytetrafluoroethylene, polyvinylidene difluoride, silicone rubber, or polycarbonate.

In some embodiments, the undercoat includes a binder. The binder includes any one of polyvinylidene fluoride, sodium carboxymethylcellulose, styrene-butadiene rubber, sodium alginate, lithium/sodium polyacrylate, polytetrafluoroethylene, polyimide, or polyurethane.

In some embodiments, the undercoat is a metal coating layer. The metal assumes a body-centered cubic structure, in which the metal includes any one of a-Fe, V, Nb, Cr, Mo, Ta, or W.

In some embodiments, the undercoat is an alloy coating layer, in which the alloy may be an alloy formed from any one or more of the following metals: Au, Ag, Sn, or Sb.

In some embodiments, the undercoat is a metal oxide coating layer, in which the oxide includes at least one of copper oxide or aluminum oxide.

In some embodiments, the undercoat is a conductive polymer coating layer, in which the conductive polymer includes any one of polyaniline, polythiophene, polypyrrole, or polyphenylacetylene.

In some embodiments, the undercoat is a conductive ceramic coating layer, in which the conductive ceramic material includes at least one of $TiB_2$, TiC, or $B_4C_3$.

In some embodiments, the undercoat is a conductive carbon coating layer, in which the conductive carbon includes at least one of conductive carbon black, graphite, carbon fibers, single-walled carbon nanotubes, multi-walled carbon nanotubes, graphene, or fullerene.

The conductive carbon coating layer can effectively reduce the overpotential of the metal deposition, suppress formation of metal dendrites, improve the normal-temperature cycle performance and high-temperature cycle performance of the battery, and reduce the high-temperature gas production phenomena of the battery.

In some embodiments, an areal density of the conductive carbon coating layer is 5 to 50 $g/m^2$. In some embodiments, the areal density of the conductive carbon coating layer is optionally any one of 5 to 10 $g/m^2$, 5 to 20 $g/m^2$, 5 to 30 $g/m^2$, 5 to 40 $g/m^2$, 5 to 50 $g/m^2$, 10 to 20 $g/m^2$, 10 to 30 $g/m^2$, 10 to 40 $g/m^2$, 10 to 50 $g/m^2$, 20 to 30 $g/m^2$, 20 to 40 $g/m^2$, 20 to 50 $g/m^2$, 30 to 40 $g/m^2$, 30 to 50 $g/m^2$, or 40 to 50 $g/m^2$.

An appropriate areal density of the undercoat can optimize the metal deposition effect, improve the Coulombic efficiency and cycle performance of the battery, and reduce the high-temperature gas production phenomena of the battery. In addition, an appropriate areal density of the undercoat can increase the energy density of the battery and meet the use requirements of the battery.

Positive Electrode Plate

In some embodiments, the positive electrode plate includes a positive current collector and a positive active material layer formed on at least a part of surfaces of the positive current collector. The positive active material layer includes a positive active material. The positive active material may include at least one of a layered transition metal oxide, a polyanionic compound, or a Prussian blue compound.

The transition metal in the layered transition metal oxide may be at least one of Mn, Fe, Ni, Co, Cr, Cu, Ti, Zn, V, Zr, or Ce. Optionally, the layered transition metal oxide is, for example, $Na_xMO_2$, where M is one or more of Ti, V, Mn, Co, Ni, Fe, Cr, or Cu, and $0<x\leq1$.

The polyanionic compound may be a type of compound containing a metal ion, a transition metal ion, and a tetrahedral $(YO_4)^{n-}$ anion unit. The metal ion is optionally one of a sodium ion, a lithium ion, a potassium ion, or a zinc ion. The transition metal is optionally at least one of Mn, Fe, Ni, Co, Cr, Cu, Ti, Zn, V, Zr, or Ce. Y is optionally at least one of P, S, or Si; and n denotes a valence of $(YO_4)^{n-}$.

The Prussian blue compound may be a compound containing a sodium ion, a transition metal ion, or a cyano ion ($CN^-$). The transition metal may be at least one of Mn, Fe, Ni, Co, Cr, Cu, Ti, Zn, V, Zr, or Ce. For example, the Prussian blue compound is $Na_aMe_bMe'_c(CN)_6$, where Me and Me' each are independently at least one of Ni, Cu, Fe, Mn, Co, or Zn, $0<a\leq2$, $0<b<1$, and $0<c<1$.

The positive active material layer may further include a conductive agent to improve the conductivity of the positive electrode. The conductive agent is optionally one or more of Super P, acetylene black, carbon black, Ketjen black, carbon dots, carbon nanotubes, graphite, graphene, or carbon nanofibers.

The positive active material layer may include a binder to firmly bind the positive active material and optionally the conductive agent onto the positive current collector. The binder is optionally at least one of polyvinylidene difluoride (PVDF), polytetrafluoroethylene (PTFE), polyacrylic acid (PAA), polyvinyl alcohol (PVA), poly(ethylene-co-vinyl acetate) (EVA), styrene-butadiene rubber (SBR), carboxymethylcellulose (CMC), sodium alginate (SA), polymethacrylic acid (PMA), or carboxymethyl chitosan (CMCS).

The positive current collector may be a conductive carbon sheet, metal foil, carbon-coated metal foil, a porous metal sheet, or a composite current collector. The conductive carbon material of the conductive carbon sheet is optionally one or more of Super P, carbon black, Ketjen black, carbon dots, carbon nanotubes, graphite, graphene, or carbon nanofibers. The metal materials of the metal foil, the carbon-coated metal foil, and the porous metal sheet each are at least one independently selected from copper, aluminum, nickel, or stainless steel. The composite current collector may be a composite current collector formed by compounding metal foil and a polymer base film.

In some embodiments, the positive electrode plate may be prepared according to the following method: dispersing the ingredients of the positive electrode plate such as the positive active material, the conductive agent, the binder, and any other ingredients into a solvent (such as N-methylpyrrolidone) to form a positive electrode slurry, coating a positive current collector with the positive electrode slurry, and performing steps such as drying and cold pressing to obtain the positive electrode plate.

[Separator]

In some embodiments, the sodium-ion battery further includes a separator. The type of the separator is not particularly limited in this application, and may be any well-known porous separator that is highly stable both chemically and mechanically.

In some embodiments, the material of the separator may be at least one selected from polyethylene, polypropylene, polyvinylidene fluoride, aramid fiber, polyethylene terephthalate, polytetrafluoroethylene, polyacrylonitrile, polyimide, polyamide, polyester, or natural fiber. The separator may be a single-layer film or a multilayer composite film, without being particularly limited. When the separator is a multilayer composite film, materials in different layers may be identical or different, without being particularly limited.

In some embodiments, the positive electrode plate, the negative electrode plate, and the separator may be made into an electrode assembly by winding or stacking.

In some embodiments, the sodium-ion battery may further include an outer package. The outer package may be configured to package the electrode assembly and the electrolyte solution.

In some embodiments, the outer package of the sodium-ion battery may be a hard shell such as a hard plastic shell, an aluminum shell, a steel shell, or the like. Alternatively, the outer package of the sodium-ion battery may be a soft package such as a pouch-type soft package. The soft package may be made of plastic such as polypropylene, polybutylene terephthalate, or polybutylene succinate.

The shape of the sodium-ion battery is not particularly limited in this application, and may be cylindrical, prismatic or any other shape. As an example, FIG. 1 shows a prismatic sodium-ion battery 5.

Figure 2:
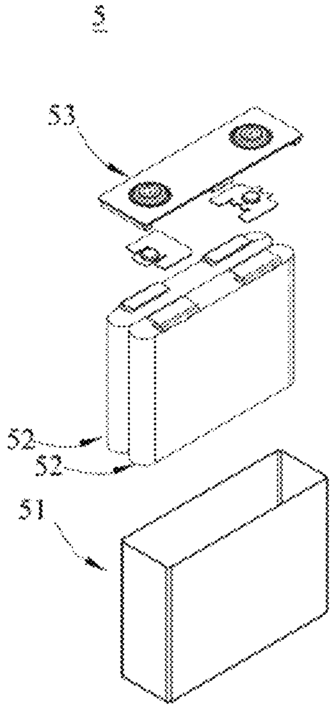
FIG. 2 is an exploded view of the secondary battery shown in FIG. 1 according to an embodiment of this application.

In some embodiments, referring to FIG. 2, the outer package may include a housing 51 and a cover plate 53. The housing 51 may include a bottom plate and a side plate connected to the bottom plate. The bottom plate and the side plate close in to form an accommodation cavity. An opening that communicates with the accommodation cavity is created on the housing 51. The cover plate 53 can fit and cover the opening to close the accommodation cavity. The positive electrode plate, the negative electrode plate, and the separator may be made into the electrode assembly 52 by winding or stacking. The electrode assembly 52 is packaged in the accommodation cavity. The electrolyte solution infiltrates in the electrode assembly 52. The number of electrode assemblies 52 in a sodium-ion battery 5 may be one or more, and may be selected by a person skilled in the art as actually required.

In some embodiments, the sodium-ion battery may be assembled into a battery module. The battery module may include one or more sodium-ion batteries, and the specific number of sodium-ion batteries in a battery module may be selected by a person skilled in the art depending on practical applications and capacity of the battery module.

Figure 3:
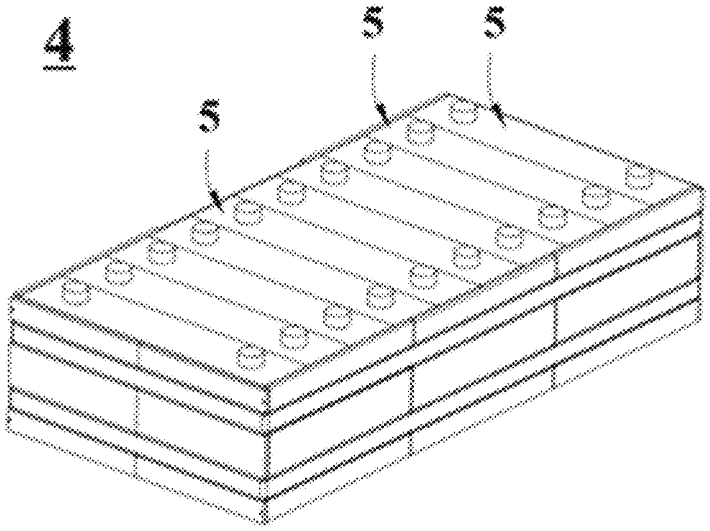
FIG. 3 is a schematic diagram of a battery module according to an embodiment of this application.

FIG. 3 shows a battery module 4 as an example. Referring to FIG. 3, in the battery module 4, a plurality of sodium-ion batteries 5 may be arranged sequentially along a length direction of the battery module 4. Alternatively, the secondary batteries may be arranged in any other manner. Further, the plurality of sodium-ion batteries 5 may be fixed by a fastener.

Optionally, the battery module 4 may further include a shell that provides an accommodation space. The plurality of sodium-ion batteries 5 are accommodated in the accommodation space.

In some embodiments, the battery module may be assembled to form a battery pack. The battery pack may include one or more battery modules, and the specific number of battery modules in a battery pack may be selected by a person skilled in the art depending on practical applications and capacity of the battery pack.

Figure 4:
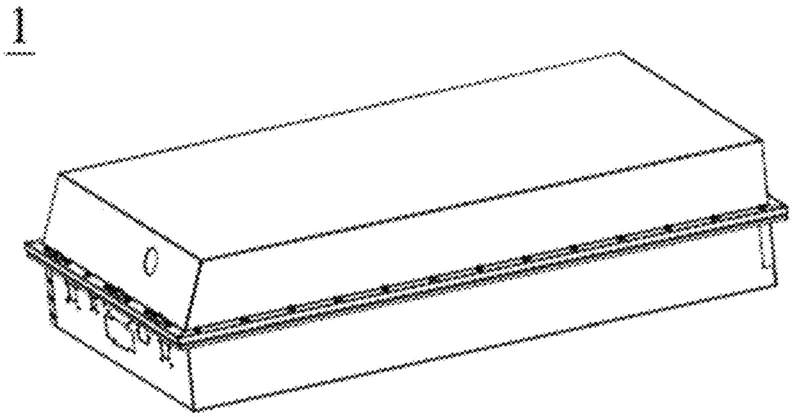
FIG. 4 is a schematic diagram of a battery pack according to an embodiment of this application.
Figure 5:
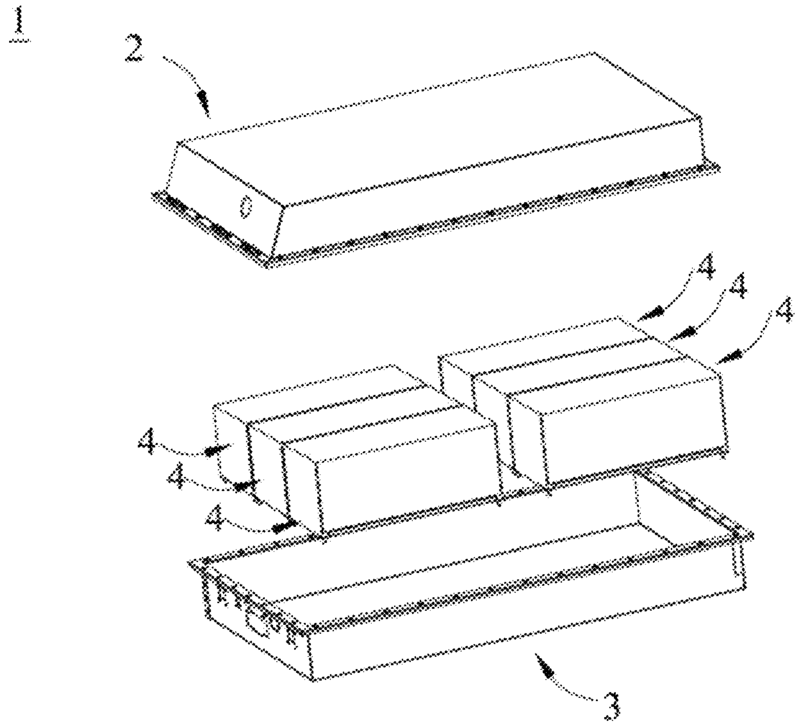
FIG. 5 is an exploded view of the battery pack shown in FIG. 4 according to an embodiment of this application.

FIG. 4 and FIG. 5 show a battery pack 1 as an example. Referring to FIG. 4 and FIG. 5, the battery pack 1 may include a battery box and a plurality of battery modules 4 disposed in the battery box. The battery box includes an upper box 2 and a lower box 3. The upper box 2 fits the lower box 3 to form a closed space for accommodating the battery modules 4. The plurality of battery modules 4 may be arranged in the battery box in any manner.

Further, this application provides an electrical device. The electrical device includes at least one of the sodium-ion battery, the battery module, or the battery pack according to this application. The sodium-ion battery, the battery module, or the battery pack may be used as a power supply of the electrical device, or used as an energy storage unit of the electrical device. The electrical device may include, but without being limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

The sodium-ion battery, the battery module, or the battery pack may be selected for use in the electrical device according to practical requirements.

Figure 6:
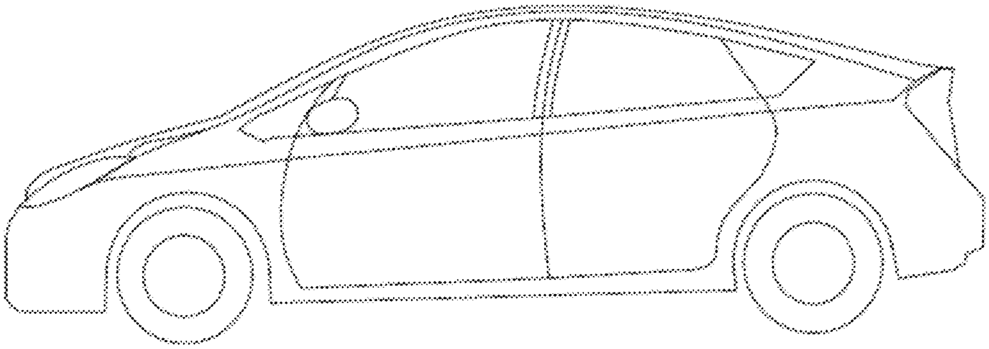
FIG. 6 is a schematic diagram of an electrical device that uses a secondary battery as a power supply according to an embodiment of this application.

FIG. 6 shows an electrical device as an example. The electrical device may be a battery electric vehicle, a hybrid electric vehicle, a plug-in hybrid electric vehicle, or the like. To meet the requirements of the electrical device for a high power and a high energy density of the sodium-ion battery, a battery pack or a battery module may be used for the electrical device.

In another example, the device may be a mobile phone, a tablet computer, a notebook computer, or the like. The device is generally required to be thin and light, and may use a sodium-ion battery as a power supply.

EMBODIMENTS

The following describes some embodiments of this application. The embodiments described below are illustrative, and are merely intended to construe this application but not to limit this application. Unless techniques or conditions are otherwise expressly specified in an embodiment hereof, the techniques or conditions described in the literature in this field or in an instruction manual of the product are applicable in the embodiment. A reagent or instrument used herein without specifying a manufacturer is a conventional product that is commercially available in the market.

I. Preparation Methods

Embodiment 1

1) Preparing an Electrolyte Solution

Adding a first sodium salt sodium hexafluorophosphate and a second sodium salt sodium bis(fluorosulfonyl)imide into an ethylene glycol dimethyl ether solvent in an argon atmosphere glovebox in which the water content is less than 10 ppm, stirring well, and then adding additives lithium hexafluorophosphate and 1,3-dioxolane, where, based on the total mass of the electrolyte solution, the mass percent of the lithium hexafluorophosphate is 4%, the mass percent of the sodium bis (fluorosulfonyl)imide is 5%, and the mass percent of the sodium hexafluorophosphate is 15%. Polymerizing the electrolyte solution in-situ at room temperature (23° C. to 27° C.) for 48 hours to obtain a secondary battery electrolyte solution.

2) Preparing a Positive Electrode Plate

Mixing $Na_3V_2(PO_4)_3$ as a positive active material, polyvinylidene difluoride (PVDF) as a binder, and conductive carbon black (Super P) as a conductive agent at a mass ratio of 96%: 2%: 2% in an N-methyl-pyrrolidone (NMP) solvent, stirring well to obtain a positive electrode slurry. Applying, by using an extrusion coating machine, the positive electrode slurry onto the surface of an aluminum foil at a concentration that meets the requirement on the mass of the positive active material per unit area, and then oven-drying the slurry. Cold-pressing the coated electrode plate until a compaction density of 2.5 g/cm$^3$ by using a cold-pressing machine, so as to obtain a finished positive electrode plate.

3) Preparing a Negative Electrode Plate

Adding carbon nanotubes and sodium alginate into water, and stirring the mixture to form a homogeneous slurry. Applying the slurry onto a negative current collector foil. Oven-drying the slurry, and cutting the foil to obtain a negative electrode plate without a negative electrode structure, where the areal density of the undercoat is 10 g/m$^2$.

4) Separator

Using a polyethylene (PE) film as a separator.

5) Preparing a Battery

Stacking the positive electrode plate, the separator, and the negative electrode plate sequentially in such a way that the separator is located between the positive electrode plate and the negative electrode plate to a serve a separation function. Injecting the electrolyte solution prepared above, and assembling the plates to form a button battery.

Embodiments 2 to 4

The batteries in Embodiments 2 to 4 are prepared by a method similar to the battery preparation method in Embodiment 1 except that the lithium hexafluorophosphate is replaced with aluminum chloride, aluminum perchlorate, and lithium tetrafluoroborate, respectively. The specific adjusted parameters are set out in Table 1 below.

Embodiments 5 to 8

The batteries in Embodiments 5 to 8 are prepared by a method similar to the battery preparation method in Embodiment 1 except an adjusted mass percent of the lithium hexafluorophosphate in the electrolyte solution. The specific adjusted parameters are set out in Table 1 below.

Embodiments 9 to 11

The batteries in Embodiments 9 to 11 are prepared by a method similar to the battery preparation method in Embodiment 1 except that the 1,3-dioxolane is replaced with tetrahydropyran, tetrahydrofuran, and 1,4-dioxane, respectively. The specific adjusted parameters are set out in Table 1 below.

Embodiment 12

The battery in Embodiment 12 is prepared by a method similar to the battery preparation method in Embodiment 1 except that the ethylene glycol dimethyl ether is replaced with dimethyl carbonate. The specific adjusted parameters are set out in Table 1 below.

Embodiments 13 to 18

The batteries in Embodiments 13 to 18 are prepared by a method similar to the battery preparation method in Embodiment 1 except an adjusted volume content of the 1,3-dioxolane in the electrolyte solution. The specific adjusted parameters are set out in Table 1 below.

Embodiment 19

The battery in Embodiment 19 is prepared by a method similar to the battery preparation method in Embodiment 1 except that the sodium bis(fluorosulfonyl)imide is replaced with sodium hexafluorophosphate, that is, the mass percent of the sodium hexafluorophosphate in the electrolyte solution is 20%. The specific adjusted parameters are set out in Table 1 below.

Embodiment 20

The battery in Embodiment 20 is prepared by a method similar to the battery preparation method in Embodiment 1 except that the sodium hexafluorophosphate is replaced with sodium bis(fluorosulfonyl)imide, that is, the mass percent of the sodium bis(fluorosulfonyl)imide in the electrolyte solution is 20%. The specific adjusted parameters are set out in Table 1 below.

Embodiments 21 to 24

The batteries in Embodiments 21 to 24 are prepared by a method similar to the battery preparation method in Embodiment 1 except an adjusted mass percent of the sodium hexafluorophosphate in the electrolyte solution. The specific adjusted parameters are set out in Table 1 below.

Embodiments 25 to 26

The batteries in Embodiments 25 to 26 is prepared by a method similar to the battery preparation method in Embodiment 1 except that the sodium bis(fluorosulfonyl)imide is replaced with sodium triflate and sodium bis(trifluoromethanesulfonyl)imide, respectively. The specific adjusted parameters are set out in Table 1 below.

Embodiments 27 to 30

The batteries in Embodiments 27 to 30 are prepared by a method similar to the battery preparation method in Embodiment 1 except an adjusted mass percent of the sodium bis(fluorosulfonyl)imide in the electrolyte solution. The specific adjusted parameters are set out in Table 1 below.

Embodiment 31

The battery in Embodiment 31 is prepared by a method similar to the battery preparation method in Embodiment 1 except an adjusted preparation process of the negative electrode plate: Adding carbon nanotubes and sodium alginate into water, stirring well to form a homogeneous slurry, applying the slurry onto a negative current collector foil, oven-drying the slurry, cutting the foil to obtain a negative current collector with an undercoat, where the areal density of the undercoat is 10 $g/m^2$; mixing well hard carbon as a negative active material, acetylene black as a conductive agent, styrene-butadiene rubber (SBCs) as a binder, and carboxymethyl cellulose (CMC) as a thickener at a mass ratio of 90:5:4:1 in an appropriate amount of deionized water to form a homogeneous negative electrode slurry; applying the negative electrode slurry onto a negative current collector foil with an undercoat, drying the slurry at 100° C., and pressing the foil to obtain a negative electrode plate. The specific adjusted parameters are set out in Table 1 below.

Embodiment 32

The battery in Embodiment 32 is prepared by a method similar to the battery preparation method in Embodiment 1 except that the negative electrode plate is replaced with an aluminum foil. The specific adjusted parameters are set out in Table 1 below.

Embodiment 33

The battery in Embodiment 33 is prepared by a method similar to the battery preparation method in Embodiment 31 except that the carbon nanotubes are replaced with aluminum oxide. The specific adjusted parameters are set out in Table 1 below.

Embodiments 34 to 37

The batteries in Embodiments 34 to 37 are prepared by a method similar to the battery preparation method in Embodiment 1 except an adjusted areal density of the undercoat of the negative electrode plate. The specific adjusted parameters are set out in Table 1 below.

Embodiment 38

The battery in Embodiment 38 is prepared by a method similar to the battery preparation method in Embodiment 1 except an adjusted mass percent of the lithium hexafluorophosphate in the electrolyte solution. The specific adjusted parameters are set out in Table 1 below.

Embodiment 39

The battery in Embodiment 39 is prepared by a method similar to the battery preparation method in Embodiment 1 except an adjusted mass percent of the sodium hexafluorophosphate in the electrolyte solution. The specific adjusted parameters are set out in Table 1 below.

Comparative Embodiment 1

The battery in Comparative Embodiment 1 is prepared by a method similar to the battery preparation method in Embodiment 1 except that the electrolyte solution contains neither the lithium hexafluorophosphate nor the 1,3-dioxolane. The specific adjusted parameters are set out in Table 1 below.

Comparative Embodiment 2

The battery in Comparative Embodiment 2 is prepared by a method similar to the battery preparation method in Comparative Embodiment 1 except that the solvent is replaced with dimethyl carbonate. The specific adjusted parameters are set out in Table 1 below.

Comparative Embodiment 3

The battery in Comparative Embodiment 3 is prepared by a method similar to the battery preparation method in Comparative Embodiment 1 except an adjusted mass percent of the sodium hexafluorophosphate in the electrolyte solution. The specific adjusted parameters are set out in Table 1 below.

Comparative Embodiment 4

The battery in Comparative Embodiment 4 is prepared by a method similar to the battery preparation method in Comparative Embodiment 3 except that the ethylene glycol dimethyl ether is replaced with dimethyl carbonate.

Comparative Embodiment 5

The battery in Comparative Embodiment 5 is prepared by a method similar to the battery preparation method in Embodiment 1 except that the electrolyte solution contains no 1,3-dioxolane. The specific adjusted parameters are set out in Table 1 below.

Comparative Embodiment 6

The battery in Comparative Embodiment 6 is prepared by a method similar to the battery preparation method in Embodiment 33 except that the electrolyte solution contains neither the lithium hexafluorophosphate nor the 1,3-dioxolane. The specific adjusted parameters are set out in Table 1 below.

Comparative Embodiment 7

The battery in Comparative Embodiment 7 is prepared by a method similar to the battery preparation method in Comparative Embodiment 6 except an adjusted mass percent of the sodium hexafluorophosphate in the electrolyte solution. The specific adjusted parameters are set out in Table 1 below.

Comparative Embodiment 8

The battery in Comparative Embodiment 8 is prepared by a method similar to the battery preparation method in Embodiment 1 except that the lithium hexafluorophosphate in the electrolyte solution is replaced with sodium hexafluorophosphate. The specific adjusted parameters are set out in Table 1 below.

II. Performance Test

The performance test method is as follows:

1. Polyether

1) Detecting the Polyether

Disassembling a battery, extracting the electrolyte solution that has completed polymerization, and collecting spectral data of the extracted electrolyte solution in a reflection mode by using a Thermo Scientific infrared spectrometer. It is determined that the electrolyte solution contains a polyether if a long-chain vibration infrared absorption peak of the main chain of the polymer is exhibited at 800 $cm^{-1}$ to 900 $cm^{-1}$ (for example, near 850 $cm^{-1}$) and a vibration absorption peak of a C—O—C bond-containing functional group is exhibited at 950 $cm^{-1}$ to 1050 $cm^{-1}$ (for example, near 1000 $cm^{-1}$) in the spectrum.

2) Mass Percent of the Polyether

Disassembling the battery cell, and removing the electrolyte solution. Taking 5 mg of the polymerized electrolyte solution, and ultrasonically dissolving and dispersing the electrolyte solution in tetrahydrofuran. Subsequently, subjecting the resulting dispersion solution to gel permeation chromatography to determine the mass of the polyether in the electrolyte solution or the mass percent of the polyether based on the total mass of the electrolyte solution.

2. Electrolyte Solution

1) Mass Percent of the Lithium Ions

Obtaining the electrolyte solution in the battery by centrifugation, and testing the electrolyte solution by use of an ion chromatograph to obtain the mass percent of the lithium ions based on the total mass of the electrolyte solution.

2) Viscosity of the Electrolyte Solution

Determining the viscosity of the electrolyte solution at 25° C. by using a rheometer. Shearing the electrolyte solution at 25° C. and a normal pressure (0.1 MPa), and setting the shear rate of the rheometer to 0.1 $s^{-1}$ to 300 $s^{-1}$. Plotting a viscosity curve from a series of viscosity values measured at different shear rates, and reading the resulting viscosity values.

3) Ionic Conductivity of the Electrolyte Solution

Measuring the ionic conductivity of the electrolyte solution at 25° C. and a normal pressure (0.1 MPa) by using a conductivity meter. Cleaning the conductivity electrode with deionized water, and rinsing off any residual water with anhydrous ethanol. Drying the electrode and then extending the dry electrode into a test tube that contains the electrolyte solution specimen. Ensuring that the platinum electrode is submerged in the electrolyte solution specimen. Recording the result after the readout of the instrument gets steady. Measuring the specimen for three times, and averaging out the recorded values.

3. Battery

1) Testing the First-Cycle Coulombic Efficiency

Charging a battery at a constant current rate of 0.1 C in a 25° C. and normal-pressure (0.1 MPa) environment until the voltage reaches 3.5 V, and recording a charge capacity at this time as a first-cycle charge capacity of the battery. Leaving the battery to stand for 5 minutes, and then discharging the battery at a constant current of 0.1 C rate until the voltage drops to 3.2 V, leaving the battery to stand for 5 minutes, and recording the discharge capacity at this time as a first-cycle discharge capacity of the battery. Calculating the first-cycle Coulombic efficiency of the battery as: first-cycle Coulombic efficiency (%)=first-cycle discharge capacity/first-cycle charge capacity×100%.

2) Normal-Temperature Cycle Performance

Charging a battery at a constant current of 0.5 C in a 25° C. and normal-pressure (0.1 MPa) environment until the voltage reaches 3.5 V, and then discharging the battery at a constant current of 1 C until the voltage drops to 3.2 V, thereby completing one charge-discharge cycle. Repeating the above charging and discharging process for 500 cycles, and recording the cycle capacity retention rate by assuming that the first-cycle discharge capacity is 100%. Using the capacity retention rate as an indicator of the cycle performance of the battery.

3) High-Temperature Cycle Performance

Charging a battery at a constant current of 0.5 C in a 60° C. and normal-pressure (0.1 MPa) environment until the voltage reaches 3.5 V, and then discharging the battery at a constant current of 1 C until the voltage drops to 3.2 V, thereby completing one charge-discharge cycle. Repeating the above charging and discharging process for 500 cycles, and recording the cycle capacity retention rate by assuming that the first-cycle discharge capacity is 100%. Using the capacity retention rate as an indicator of the cycle performance of the battery.

4) High-Temperature Anti-Gassing Capability

Charging a battery at a constant current of 0.5 C at a room temperature (25° C.) until the voltage reaches 3.5 V. Measuring the initial volume of the fully-charged battery by a drainage method. Storing the battery in an 60° C. oven for 24 days, and then taking out the battery. Leaving the battery to stand for 60 minutes at a room temperature. Measuring the volume of the battery by a drainage method within a period of 60 minutes after the battery is cooled down to a room temperature. Calculating the volume expansion rate of the battery against the battery volume measured before storage. Calculating the volume expansion rate of the battery that has been stored at 60° C. for 24 days as: volume expansion rate (%)=(volume of the battery measured after storage/volume of the battery measured before storage)−1.

III. Analysis on the Test Results of Embodiments and Comparative Embodiments

The batteries described in the embodiments and the comparative embodiments are prepared according to the foregoing methods respectively, and performance parameters of the batteries are measured. The test results are shown in Table 1 below.

TABLE 1

Preparation parameters and test results of embodiments and comparative embodiments

| Embodiment 8 | Embodiment 7 | Embodiment 6 | Embodiment 5 | Embodiment 4 | Embodiment 3 | Embodiment 2 | Embodiment 1 | Serial number | |
|---|---|---|---|---|---|---|---|---|---|
| $LiPF_6$ | $LiPF_6$ | $LiPF_6$ | $LiPF_6$ | $LiBF_1$ | $LiCIO_4$ | $AICI_3$ | $LiPF_6$ | Name | Additive |
| 8% | 6% | 2% | 1% | 4% | 4% | 4% | 4% | Mass percent | |
| $NaPF_6$ | $NaPF_6$ | $NaPF_6$ | $NaPF_6$ | $NaPF_6$ | $NaPF_6$ | $NaPF_6$ | $NaPF_6$ | Name | First sodium salt |
| 15% | 15% | 15% | 15% | 15% | 15% | 15% | 15% | Mass percent | |
| NaFSI | NaFSI | NaFSI | NaFSI | NaFSI | NaFSI | NaFSI | NaFSI | Name | Second sodium salt |
| 5% | 5% | 5% | 5% | 5% | 5% | 5% | 5% | Mass percent | |
| 1,3-dioxolane | 1,3-dioxolane | 1,3-dioxolane | 1,3-dioxolane | 1,3-dioxolane | 1,3-dioxolane | 1,3-dioxolane | 1,3-dioxolane | Name | Cyclic ether compound |
| Ethylene glycol dimethyl ether | Ethylene glycol dimethyl ether | Ethylene glycol dimethyl ether | Ethylene glycol dimethyl ether | Ethylene glycol dimethyl ether | Ethylene glycol dimethyl ether | Ethylene glycol dimethyl ether | Ethylene glycol dimethyl ether | Name | Solvent |
| 1 | 1 | 1 | 1 | 1 | 1 | 1 | 1 | Volume content of cyclic ether compound | |
| Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Name | Polyether |
| 39.60% | 40.70% | 42.90% | 43.46% | 41.81% | 41.81% | 41.81% | 41.81% | Mass percent | |
| 0.40% | 0.30% | 0.10% | 0.05% | 0.30% | 0.26% | 0 | 0.18% | Mass percent of lithium ions | |
| 10 | 10 | 10 | 10 | 10 | 10 | 10 | 10 | Areal density of undercoat ($g/m^2$) | |
| 120.65 | 131.74 | 134.96 | 136.45 | 132.59 | 1.63 | 1.72 | 132.26 | Viscosity (mPa · s) | Electrolyte solution |
| 0.31 | 0.26 | 0.24 | 0.22 | 0.23 | 2.59 | 2.16 | 0.25 | Electrical conductivity (mS/cm) | |
| 94.29% | 94.68% | 94.79% | 94.12% | 95.05% | 95.26% | 95.37% | 95.01% | First-cycle coulombic efficiency | Battery |
| 86.18% | 88.21% | 89.03% | 86.06% | 90.19% | 90.11% | 90.05% | 90.15% | Normal-temperature cycle capacity retention rate | |
| 81.15% | 82.30% | 83.17% | 81.06% | 85.13% | 82.33% | 81.36% | 85.23% | High-temperature cycle capacity retention rate | |
| 0.37% | 0.26% | 0.24% | 0.36% | 0.21% | 0.22% | 0.26% | 0.21% | High-temperature thickness expansion rate | |

| Embodiment 17 | Embodiment 16 | Embodiment 15 | Embodiment 14 | Embodiment 13 | Embodiment 12 | Embodiment 11 | Embodiment 10 | Embodiment 9 | Serial number | |
|---|---|---|---|---|---|---|---|---|---|---|
| $LiPF_6$ | $LiPF_6$ | $LiPF_6$ | LiPF | $LiPF_6$ | $LiPF_6$ | $LiPF_6$ | $LiPF_6$ | $LiPF_6$ | Name | Additive |
| 4% | 4% | 4% | 4% | 4% | 4% | 4% | 4% | 4% | Mass percent | |
| $NaPF_6$ | $NaPF_6$ | $NaPF_6$ | $NaPF_6$ | $NaPF_6$ | $NaPF_6$ | $NaPF_6$ | NaPF | $NaPF_6$ | Name | First sodium salt |
| 15% | 15% | 15% | 15% | 15% | 15% | 15% | 15% | 15% | Mass percent | |
| NaFSI | NaFSI | NaFSI | NaFSI | NaFSI | NaFSI | NaFSI | NaFSI | NaFSI | Name | Second sodium salt |
| 5% | 5% | 5% | 5% | 5% | 5% | 5% | 5% | 5% | Mass percent | |
| 1,3-dioxolane | 1,3-dioxolane | 1,3-dioxolane | 1,3-dioxolane | 1,3-dioxolane | 1,3-dioxolane | 1,4-dioxane | Tetrahydrofuran | Tetrahydropyran | Name | Cyclic ether compound |
| Ethylene glycol dimethyl ether | Ethylene glycol dimethyl ether | Ethylene glycol dimethyl ether | Ethylene glycol dimethyl ether | Ethylene glycol dimethyl ether | Dimethyl carbonate | Ethylene glycol dimethyl ether | Ethylene glycol dimethyl ether | Ethylene glycol dimethyl ether | Name | Solvent |
| 1/5 | 1/3 | 3 | 5 | 7 | 1 | 1 | 1 | 1 | Volume content of cyclic ether compound | |
| Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Poly(1,4-dioxane) generated by in-situ polymerization | Polytetrahydrofuran generated by in-situ polymerization | Polytetrahydropyran generated by in-situ polymerization | Name | Polyether |

TABLE 1-continued

Preparation parameters and test results of embodiments and comparative embodiments

| | | | | | | | | | | |
|---|---|---|---|---|---|---|---|---|---|---|
| 14.93% | 22.00% | 59.72% | 62.32% | 68.05% | 37.82% | 39.98% | 38.50% | 38.35% | Mass percent | |
| 0.18% | 0.18% | 0.18% | 0.18% | 0.18% | 0.18% | 0.18% | 0.18% | 0.18% | Mass percent of lithium ions | |
| 10 | 10 | 10 | 10 | 10 | 10 | 10 | 10 | 10 | Areal density of undercoat ($g/m^2$) | |
| 45.98 | 68.26 | 859.27 | 986.35 | 1265.55 | 109.68 | 122.35 | 114.56 | 112.25 | Viscosity (mPa · s) | Electrolyte |
| 0.65 | 0.59 | 0.12 | 0.12 | 0.06 | 0.39 | 0.29 | 0.32 | 0.35 | Electrical conductivity (mS/cm) | solution |
| 95.16% | 95.17% | 94.79% | 94.56% | 94.31% | 80.34% | 95.07% | 95.11% | 95.03% | First-cycle coulombic efficiency | Battery |
| 90.46% | 90.30% | 88.26% | 87.56% | 86.34% | 0 | 86.24% | 88.39% | 88.65% | Normal-temperature cycle capacity retention rate | |
| 80.40% | 82.93% | 84.20% | 83.72% | 81.36% | 0 | 81.34% | 83.22% | 83.15% | High-temperature cycle capacity retention rate | |
| 0.39% | 0.27% | 0.24% | 0.35% | 0.48% | 5.29% | 0.26% | 0.24% | 0.23% | High-temperature thickness expansion rate | |
| Embodiment 26 | Embodiment 25 | Embodiment 24 | Embodiment 23 | Embodiment 22 | Embodiment 21 | Embodiment 20 | Embodiment 19 | Embodiment 18 | Serial number | |
| $LiPF_6$ | $LiPF_6$ | $LiPF_6$ | $LiPF_6$ | $LiPF_6$ | $LiPF_6$ | $LiPF_6$ | $LiPF_6$ | $LiPF_6$ | Name | Additive |
| 4% | 4% | 4% | 4% | 4% | 4% | 4% | 4% | 4% | Mass percent | |
| $NaPF_6$ | $NaPF_6$ | $NaPF_6$ | $NaPF_6$ | $NaPF_6$ | $NaPF_6$ | / | $NaPF_6$ | $NaPF_6$ | Name | First sodium |
| 15% | 15% | 42% | 40% | 2% | 1% | / | 20% | 15% | Mass percent | salt |
| NaTFSI | NaOTf | NaFSI | NaFSI | NaFSI | NaFSI | NaFSI | / | NaFSI | Name | Second sodium |
| 5% | 5% | 5% | 5% | 5% | 5% | 20% | / | 5% | Mass percent | salt |
| 1,3-dioxolane | 1,3-dioxolane | 1,3-dioxolane | 1,3-dioxolane | 1,3-dioxolane | 1,3-dioxolane | 1,3-dioxolane | 1,3-dioxolane | 1,3-dioxolane | Name | Cyclic ether compound |
| Ethylene glycol dimethyl ether | Ethylene glycol dimethyl ether | Ethylene glycol dimethyl ether | Ethylene glycol dimethyl ether | Ethylene glycol dimethyl ether | Ethylene glycol dimethyl ether | Ethylene glycol dimethyl ether | Ethylene glycol dimethyl ether | Ethylene glycol dimethyl ether | Name | Solvent |
| 1 | 1 | 1 | 1 | 1 | 1 | 1 | 1 | 1/7 | Volume content of cyclic ether compound | |
| Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Name | Polyether |
| 41.81% | 41.81% | 26.95% | 28.05% | 46.19% | 49.51% | 41.81% | 41.81% | 11.30% | Mass percent | |
| 0.18% | 0.18% | 0.18% | 0.18% | 0.18% | 0.18% | 0.18% | 0.18% | 0.18% | Mass percent of lithium ions | |
| 10 | 10 | 10 | 10 | 10 | 10 | 10 | 10 | 10 | Areal density of undercoat ($g/m^2$) | |
| 132.89 | 132.69 | 70.63 | 79.65 | 196.25 | 254.96 | 131.89 | 133.96 | 32.68 | Viscosity (mPa · s) | Electrolyte |
| 0.26 | 0.26 | 0.51 | 0.48 | 0.21 | 0.20 | 0.26 | 0.23 | 0.87 | Electrical conductivity (mS/cm) | solution |
| 95.09% | 95.17% | 88.14% | 91.06% | 90.02% | 85.22% | 82.69% | 95.28% | 95.09% | First-cycle coulombic efficiency | Battery |
| 90.15% | 90.11% | 78.22% | 86.36% | 85.37% | 56.23% | 0 | 90.33% | 90.58% | Normal-temperature cycle capacity retention rate | |
| 82.49% | 83.26% | 78.47% | 80.06% | 76.42% | 43.59% | 0 | 76.31% | 75.11% | High-temperature cycle capacity retention rate | |
| 0.27% | 0.25% | 0.89% | 0.39% | 0.46% | 0.95% | 1.79% | 1.49% | 0.51% | High-temperature thickness expansion rate | |
| Embodiment 35 | Embodiment 34 | Embodiment 33 | Embodiment 32 | Embodiment 31 | Embodiment 30 | Embodiment 29 | Embodiment 28 | Embodiment 27 | Serial number | |
| $LiPF_6$ | $LiPF_6$ | $LiPF_6$ | $LiPF_6$ | $LiPF_6$ | $LiPF_6$ | $LiPF_6$ | $LiPF_6$ | $LiPF_6$ | Name | Additive |
| 4% | 4% | 4% | 4% | 4% | 4% | 4% | 4% | 4% | Mass percent | |
| $NaPF_6$ | $NaPF_6$ | $NaPF_6$ | $NaPF_6$ | $NaPF_6$ | $NaPF_6$ | $NaPF_6$ | $NaPF_6$ | $NaPF_6$ | Name | First sodium |
| 15% | 15% | 15% | 15% | 15% | 15% | 15% | 15% | 15.0% | Mass percent | salt |
| NaFSI | NaFSI | NaFSI | NaFSI | NaFSI | NaFSI | NaFSI | NaFSI | NaFSI | Name | Second sodium |

TABLE 1-continued

Preparation parameters and test results of embodiments and comparative embodiments

| | | | | | | | | | | |
|---|---|---|---|---|---|---|---|---|---|---|
| 5% | 5% | 5% | 5% | 5% | 15% | 10% | 1% | 0.5% | Mass percent | salt |
| 1,3-dioxolane | 1,3-dioxolane | 1,3-dioxolane | 1,3-dioxolane | 1,3-dioxolane | 1,3-dioxolane | 1,3-dioxolane | 1,3-dioxolane | 1,3-dioxolane | Name | Cyclic ether compound |
| Ethylene glycol dimethyl ether | Ethylene glycol dimethyl ether | Ethylene glycol dimethyl ether | Ethylene glycol dimethyl ether | Ethylene glycol dimethyl ether | Ethylene glycol dimethyl ether | Ethylene glycol dimethyl ether | Ethylene glycol dimethyl ether | Ethylene glycol dimethyl ether | Name | Solvent |
| 1 | 1 | 1 | 1 | 1 | 1 | 1 | 1 | 1 | Volume content of cyclic ether compound | |
| Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Name | Polyether |
| 41.81% | 41.81% | 41.81% | 41.81% | 41.81% | 36.30% | 39.05% | 44.00% | 44.27% | Mass percent | |
| 0.18% | 0.18% | 0.18% | 0.18% | 0.18% | 0.18% | 0.18% | 0.18% | 0.18% | Mass percent of lithium ions | |
| 50 | 5 | 10 (aluminum oxide undercoat) | / | 10 (with a negative active | 10 | 10 | 10 | 10 | Areal density of undercoat (g/$m^2$) | |
| 132.54 | 132.62 | 132.44 | 132.82 | 132.76 | 103.25 | 120.65 | 149.56 | 153.68 | Viscosity (mPa · s) | Electrolyte |
| 0.26 | 0.26 | 0.26 | 0.26 | 0.26 | 0.36 | 0.26 | 0.22 | 0.21 | Electrical conductivity (mS/cm) | solution |
| 95.09% | 95.21% | 95.18% | 95.24% | 95.13% | 95.09% | 95.16% | 95.13% | 95.10% | First-cycle coulombic efficiency | Battery |
| 85.49% | 86.31% | 86.47% | 85.69% | 90.03% | 70.44% | 88.29% | 90.11% | 90.06% | Normal-temperature cycle capacity retention rate | |
| 79.58% | 80.51% | 78.21% | 75.13% | 82.54% | 59.31% | 76.39% | 75.36% | 60.25% | High-temperature cycle capacity retention rate | |
| 0.52% | 0.48% | 0.68% | 0.77% | 0.26% | 0.79% | 0.49% | 0.47% | 0.86% | High-temperature thickness expansion rate | |

| Comparative Embodiment 5 | Comparative Embodiment 4 | Comparative Embodiment 3 | Comparative Embodiment 2 | Comparative Embodiment 1 | Embodiment 39 | Embodiment 38 | Embodiment 37 | Embodiment 36 | Serial number | |
|---|---|---|---|---|---|---|---|---|---|---|
| $LiPF_6$ | / | / | / | / | $LiPF_6$ | $LiPF_6$ | $LiPF_6$ | $LiPF_6$ | Name | Additive |
| 4% | / | / | / | / | 4% | 10% | 4% | 4% | Mass percent | |
| $NaPF_6$ | $NaPF_6$ | $NaPF_6$ | $NaPF_6$ | $NaPF_6$ | $NaPF_6$ | $NaPF_6$ | $NaPF_6$ | $NaPF_6$ | Name | First sodium |
| 15% | 19% | 19% | 15% | 15% | 30% | 15% | 15% | 15% | Mass percent | salt |
| NaFSI | NaFSI | NaFSI | NaFSI | NaFSI | NaFSI | NaFSI | NaFSI | NaFSI | Name | Second sodium |
| 5% | 5% | 5% | 5% | 5% | 5% | 5% | 5% | 5% | Mass percent | salt |
| / | / | / | / | / | 1,3-dioxolane | 1,3-dioxolane | 1,3-dioxolane | 1,3-dioxolane | Name | Cyclic ether compound |
| Ethylene glycol dimethyl ether | Dimethyl carbonate | Ethylene glycol dimethyl ether | Dimethyl carbonate | Ethylene glycol dimethyl ether | Ethylene glycol dimethyl ether | Ethylene glycol dimethyl ether | Ethylene glycol dimethyl ether | Ethylene glycol dimethyl ether | Name | Solvent |
| / | / | / | / | / | 1 | 1 | 1 | 1 | Volume content of cyclic ether compound | |
| / | / | / | / | / | Poly(1,3-dioxolane) generated by in-situ polymerization | Poly(1,3-dioxolane) generated by in-situ polymerization | Poly(1,3-dioxolane) generated by in-situ polymerization | Poly(1,3-dioxolane) generated by in-situ polymerization | Name | Polyether |
| / | / | / | / | / | 33.55% | 37.63% | 41.81% | 41.81% | Mass percent | |
| 0 | 0 | 0 | 0 | 0 | 0.18% | 0.46% | 0.18% | 0.18% | Mass percent of lithium ions | |
| 10 | 10 | 10 | 10 | 10 | 10 | 10 | 80 | 3 | Areal density of undercoat (g/$m^2$) | |
| 129.65 | 2.01 | 1.62 | 1.89 | 1.53 | 86.74% | 108.22 | 132.59 | 132.46 | Viscosity (mPa · s) | Electrolyte |
| 0.28 | 2.01 | 2.53 | 2.49 | 2.58 | 0.45 | 0.40 | 0.26 | 0.26 | Electrical conductivity (mS/cm) | solution |
| 95.03% | 80.15% | 95.12% | 80.13% | 95.09% | 94.97% | 94.01% | 95.02% | 95.14% | First-cycle coulombic efficiency | Battery |
| 90.23% | 0 | 90.54% | 0 | 90.62% | 88.01% | 85.62% | 68.22% | 70.51% | Normal-temperature cycle | |

TABLE 1-continued

Preparation parameters and test results of embodiments and comparative embodiments

| | | | | | | | | | |
|---|---|---|---|---|---|---|---|---|---|
| | | | | | | | | | capacity retention rate |
| 48.36% | 0 | 49.37% | 0 | 50.16% | 82.96% | 80.79% | 60.13% | 62.22% | High-temperature cycle capacity retention rate |
| 2.69% | 5.56% | 2.66% | 5.68% | 2.71% | 0.27% | 0.42% | 1.16% | 1.32% | High-temperature thickness expansion rate |

| Comparative Embodiment 8 | Comparative Embodiment 7 | Comparative Embodiment 6 | Serial number | |
|---|---|---|---|---|
| / | / | / | Name | Additive |
| / | / | / | Mass percent | |
| $NaPF_6$ | $NaPF_6$ | $NaPF_6$ | Name | First sodium salt |
| 19% | 19% | 15% | Mass percent | |
| NaFSI | NaFSI | NaFSI | Name | Second sodium salt |
| 5% | 5% | 5% | Mass percent | |
| 1,3-dioxolane | / | / | Name | Cyclic ether compound |
| Ethylene glycol dimethyl ether | Ethylene glycol dimethyl ether | Ethylene glycol dimethyl ether | Name | Solvent |
| 1:1 | / | / | Volume content of cyclic ether compound | |
| / | / | / | Name | Polyether |
| / | / | / | Mass percent | |
| 0 | 0 | 0 | Mass percent of lithium ions | |
| 10 | 10 (aluminum oxide undercoat) | 10 (aluminum oxide undercoat) | Areal density of undercoat ($g/m^2$) | |
| 1.69 | 1.53 | 1.53 | Viscosity (mPa · s) | Electrolyte solution |
| 2.63 | 2.58 | 2.58 | Electrical conductivity (mS/cm) | |
| 95.22% | 95.19% | 95.12% | First-cycle coulombic efficiency | Battery |
| 90.13% | 86.58% | 86.12% | Normal-temperature cycle capacity retention rate | |
| 50.11% | 48.21% | 47.96% | High-temperature cycle capacity retention rate | |
| 2.67% | 2.59% | 2.77% | High-temperature thickness expansion rate | |

As can be seen from the above results, the secondary battery electrolyte solution in Embodiments 1 to 39 includes an electrolyte salt, a solvent, and a polyether. The electrolyte solution includes a first sodium salt and/or a second sodium salt. The first sodium salt is sodium hexafluorophosphate. The second sodium salt is any one of sodium triflate, sodium bis(fluorosulfonyl)imide, or sodium bis(trifluoromethanesulfonyl)imide. The solvent is ethylene glycol dimethyl ether or dimethyl carbonate. The polyether includes any one of poly (1,3-dioxolane), polytetrahydropyran, polytetrahydrofuran, or poly(1,4-dioxane). As can be seen from Embodiments 1 to 11 and Embodiments 13 to 39 versus Comparative Embodiments 1, 3 and 5 to 8 as well as Embodiment 12 versus Comparative Embodiments 2 and 4, the electrolyte solution containing the polyether reduces the high-temperature expansion rate of the battery, reduces the high-temperature gas production phenomena of the battery, and improves safety of the battery.

As can be seen from Embodiments 1, 3, and 4 versus Embodiment 2, the electrolyte solution includes lithium ions, and the mass percent of the lithium ions based on the total mass of the electrolyte solution is 0.05% to 0.46%, thereby improving the normal-temperature cycle performance and high-temperature cycle performance of the battery, and reducing the high-temperature gas production phenomena of the battery. As can be seen from Embodiments 1, 5 to 8, and 38, the electrolyte solution includes lithium ions, and the mass percent of the lithium ions based on the total mass of the electrolyte solution is 0.05% to 0.46%, thereby making the battery excellent in normal-temperature cycle performance and high-temperature cycle performance, and reducing the amount of gas produced at high temperature.

As can be seen from Embodiments 1 and 13 to 18, the mass percent of the polyether based on the total mass of the electrolyte solution is 10% to 70%, thereby making the battery excellent in first-cycle Coulombic efficiency, normal-temperature cycle performance, and high-temperature performance, reducing the amount of gas produced at high temperature, and broadening the temperature range in which the battery is applicable.

As can be seen from Embodiments 1 to 39, the polyether is generated by in-situ polymerization from a cyclic ether compound in the electrolyte solution as initiated by any one of the following Lewis acids: phosphorus pentafluoride, aluminum trichloride, lithium chloride, or boron trifluoride, thereby reducing the high-temperature gas production phenomena of the battery.

As can be seen from Embodiments 1, 3, and 4 versus Embodiment 2, the Lewis acid is derived from an additive in the electrolyte solution. The additive includes one or more of lithium hexafluorophosphate, lithium tetrafluoroborate, lithium perchlorate, or lithium difluoro(oxalato)borate, thereby improving the normal-temperature cycle performance and high-temperature cycle performance of the battery and reducing the high-temperature gas production phenomena of the battery.

As can be seen from Embodiments 1 and 4 versus Embodiment 3, the Lewis acid is derived from an additive in the electrolyte solution. The additive includes one or two of lithium hexafluorophosphate or lithium tetrafluoroborate, thereby improving the normal-temperature cycle performance and high-temperature cycle performance of the battery and reducing the high-temperature gas production phenomena of the battery.

As can be seen from Embodiments 1, 5 to 8, and 38, the mass percent of the added additive based on the total mass of the electrolyte solution is 1% to 10%, thereby endowing the electrolyte solution with an appropriate viscosity and high ionic conductivity, making the battery excellent in first-cycle Coulombic efficiency, normal-temperature cycle performance, and high-temperature cycle performance, and reducing the amount of gas produced at high temperature. The battery is excellent in electrochemical performance and safety performance, and the temperature range in which the battery is applicable is broadened.

As can be seen from Embodiments 1, 6, and 7 versus Embodiments 5 and 8, the mass percent of the added additive based on the total mass of the electrolyte solution is 2% to 6%, thereby improving the first-cycle Coulombic efficiency, normal-temperature cycle performance, and high-temperature cycle performance of the battery, and reducing the high-temperature gas production phenomena of the battery.

As can be seen from Embodiments 1 and 9 to 11, the cyclic ether compound includes one or more of 1,3-dioxolane, ethylene glycol diglycidyl ether, 1,4-butanediol glycidyl ether, 1,2,3,4-diepoxybutane, tetrahydrofuran, methyltetrahydrofuran, 1,4-dioxane, or tetrahydropyran, thereby endowing the electrolyte solution with an appropriate viscosity and high ionic conductivity, making the battery excellent in first-cycle Coulombic efficiency, normal-temperature cycle performance, and high-temperature cycle performance, and reducing the amount of gas produced at high temperature. The battery is excellent in electrochemical performance and safety performance, and the temperature range in which the battery is applicable is broadened.

As can be seen from Embodiment 1 versus Embodiment 12, the solvent includes a chain ether compound, thereby improving the viscosity of the electrolyte solution, improving the first-cycle Coulombic efficiency, normal-temperature cycle performance, and high-temperature cycle performance of the battery, reducing the high-temperature gas production phenomena of the battery, improving the electrochemical performance and safety performance of the battery, and broadening the temperature range in which the battery is applicable.

As can be seen from Embodiments 1 and 14 to 17 versus Embodiments 13 and 18, the volume content of the added cyclic ether compound based on the total volume of the solvent in the electrolyte solution is ⅕ to 5, thereby reducing the high-temperature gas production phenomena of the battery, endowing the electrolyte solution with an appropriate viscosity and high electrical conductivity, and keeping the battery excellent in first-cycle Coulombic efficiency, normal-temperature cycle performance, and high-temperature cycle performance.

As can be seen from Embodiments 1 and 15 to 16 versus Embodiments 13 to 14 and 17 to 18, the volume content of the added cyclic ether compound based on the total volume of the solvent in the electrolyte solution is ⅓ to 3, thereby further reducing the high-temperature gas production phenomena of the battery, endowing the electrolyte solution with an appropriate viscosity and high electrical conductivity, and keeping the battery excellent in first-cycle Coulombic efficiency, normal-temperature cycle performance, and high-temperature cycle performance.

As can be seen from Embodiments 1 and 19 to 20, the electrolyte solution includes at least one of sodium hexafluorophosphate as a first sodium salt or sodium bis(fluorosulfonyl)imide as a second sodium salt, so that the amount of gas produced by the battery at high temperature is low.

As can be seen from Embodiments 1 and 19, the electrolyte solution includes sodium hexafluorophosphate as a first sodium salt, so that the battery is excellent in first-cycle Coulombic efficiency, normal-temperature cycle performance, and high-temperature cycle performance, and the amount of gas produced by the battery at high temperature is low.

As can be seen from Embodiments 1 and 20, the electrolyte solution includes sodium bis(fluorosulfonyl)imide as a second sodium salt, so that the amount of gas produced by the battery at high temperature is low.

As can be seen from Embodiment 1 versus Embodiments 19 to 20, the electrolyte solution includes sodium hexafluorophosphate as a first sodium salt and sodium bis(fluorosulfonyl)imide as a second sodium salt, thereby improving the first-cycle Coulombic efficiency, normal-temperature cycle performance, and high-temperature cycle performance of the battery, and reducing the high-temperature gas production phenomena of the battery.

As can be seen from Embodiments 1, 22, 23, and 39 versus Embodiments 21 and 24, the mass percent of the sodium hexafluorophosphate as a first sodium salt in the electrolyte solution based on the total mass of the electrolyte solution is 2% to 40%, thereby improving the first-cycle Coulombic efficiency and normal-temperature cycle performance of the battery, and reducing the high-temperature gas production phenomena of the battery.

As can be seen from Embodiments 1, 25, and 26, the second sodium salt includes one or more of sodium triflate, sodium bis(fluorosulfonyl)imide, or sodium bis(trifluoromethanesulfonyl)imide, thereby making the battery excellent in first-cycle Coulombic efficiency, normal-temperature cycle performance, and high-temperature cycle performance, reducing the amount of gas produced at high temperature, and broadening the temperature range in which the battery is applicable.

As can be seen from Embodiments 1 and 28 to 29 versus Embodiments 27 and 30, the mass percent of the second sodium salt in the electrolyte solution based on the total mass of the electrolyte solution is 1% to 10%, thereby improving the high-temperature cycle performance of the battery, and reducing the high-temperature gas production phenomena of the battery.

As can be seen from Embodiments 1 to 37, the viscosity of the electrolyte solution at 25° C. is less than 1300 mPa·s, so that the electrolyte solution is of an appropriate viscosity and high ionic conductivity.

As can be seen from Embodiment 1 versus Embodiment 31, the secondary battery is an anode-free sodium metal battery, thereby improving the normal-temperature cycle performance and high-temperature cycle performance of the battery, and reducing the high-temperature gas production phenomena of the battery.

As can be seen from Embodiments 1 and 33 versus Embodiment 32, the negative electrode plate includes a negative current collector and an undercoat formed on at least a part of the surface of the negative current collector, thereby improving the high-temperature cycle performance of the battery, and reducing the high-temperature gas production phenomena of the battery.

As can be seen from Embodiment 1 versus Embodiment 33, the undercoat is a conductive carbon coating layer, thereby improving the normal-temperature cycle performance and high-temperature cycle performance of the battery, and reducing the high-temperature gas production phenomena of the battery.

As can be seen from Embodiments 1 and 34 to 35 versus Embodiments 36 to 37, the areal density of the conductive carbon coating layer is 5 to 50 $g/m^2$, thereby improving the normal-temperature cycle performance and high-temperature cycle performance of the battery, and reducing the high-temperature gas production phenomena of the battery.

What is claimed is:

1. A secondary battery electrolyte solution, comprising an electrolyte salt, a solvent, and a polyether, wherein the polyether is generated by in-situ polymerization from a cyclic ether compound in the electrolyte solution as initiated by a Lewis acid, and the cyclic ether compound comprises one or more of ethylene glycol diglycidyl ether, 1,4-butanediol glycidyl ether, and 1,2,3,4-diepoxybutane.

2. The electrolyte solution according to claim 1, wherein the electrolyte solution comprises lithium ions, and a mass percent of the lithium ions is 0.05% to 0.46% based on a total mass of the electrolyte solution.

3. The electrolyte solution according to claim 1, wherein a mass percent of the polyether is 10% to 70% based on a total mass of the electrolyte solution.

4. The electrolyte solution according to claim 1, wherein the Lewis acid is derived from an additive in the electrolyte solution, the additive comprises one or more of lithium hexafluorophosphate, lithium tetrafluoroborate, lithium perchlorate, or lithium difluoro (oxalato) borate, and optionally, the additive is one or two of lithium hexafluorophosphate or lithium tetrafluoroborate.

5. The electrolyte solution according to claim 4, wherein, based on a total mass of the electrolyte solution, a mass percent of the added additive is 1% to 10%, and optionally 2% to 6%.

6. The electrolyte solution according to claim 1, wherein, based on a total volume of the solvent in the electrolyte solution, a volume content of the added cyclic ether compound is ⅕ to 5, and optionally ⅓ to 3.

7. The electrolyte solution according to claim 1, wherein the electrolyte salt comprises at least one of a first sodium salt or a second sodium salt; the first sodium salt comprises one or more of sodium hexafluorophosphate, sodium tetrafluoroborate, sodium hexafluoroarsenate, or sodium trifluoroacetate; and an anion structure of the second sodium salt comprises at least one of structures represented by Formula I and Formula II:

Formula I

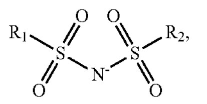

Formula II

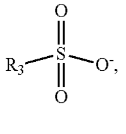

wherein $R^1$, $R^2$, and $R^3$ each independently are fluorine or a $C_1$ to $C_6$ fluoroalkyl.

8. The electrolyte solution according to claim 7, wherein, based on a total mass of the electrolyte solution, a mass percent of the first sodium salt in the electrolyte solution is 2% to 40%.

9. The electrolyte solution according to claim 7, wherein the second sodium salt comprises one or more of sodium triflate, sodium bis(fluorosulfonyl)imide, or sodium bis(trifluoromethanesulfonyl)imide.

10. The electrolyte solution according to claim 7, wherein, based on a total mass of the electrolyte solution, a mass percent of the second sodium salt in the electrolyte solution is 1% to 10%.

11. The electrolyte solution according to claim 1, wherein a viscosity of the electrolyte solution at 25° C. is less than 1300 mPa·s.

12. A secondary battery, comprising the electrolyte solution according to claim 1.

13. A method for preparing the secondary battery electrolyte solution according to claim 1, comprising:

adding an additive and the cyclic ether compound into a composition containing the electrolyte salt and the solvent, wherein the additive is a Lewis acid; and performing in-situ polymerization for at least 24 hours to obtain the secondary battery electrolyte solution.

14. The preparation method according to claim 13, wherein the additive comprises one or more of lithium hexafluorophosphate, lithium tetrafluoroborate, lithium perchlorate, lithium difluoro (oxalato) borate, aluminum chloride, or aluminum triflate, and optionally, the additive is one or two of lithium hexafluorophosphate or lithium tetrafluoroborate.

15. The preparation method according to claim 13, wherein, based on a total mass of the electrolyte solution, a mass percent of the added additive is 1% to 10%, and optionally 2% to 6%.

* * * * *